US012271897B2

United States Patent
Liu

(10) Patent No.: US 12,271,897 B2
(45) Date of Patent: Apr. 8, 2025

(54) REPEAT TRANSACTION VERIFICATION METHOD, APPARATUS, AND DEVICE, AND MEDIUM

(71) Applicant: TENCENT TECHNOLOGY (SHENZHEN) COMPANY LIMITED, Shenzhen (CN)

(72) Inventor: Qucheng Liu, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 175 days.

(21) Appl. No.: 18/073,355

(22) Filed: Dec. 1, 2022

(65) Prior Publication Data

US 2023/0102617 A1 Mar. 30, 2023

Related U.S. Application Data

(63) Continuation of application No. PCT/CN2022/090110, filed on Apr. 29, 2022.

(30) Foreign Application Priority Data

May 14, 2021 (CN) .......................... 202110526205.3

(51) Int. Cl.
  *G06Q 30/00* (2023.01)
  *G06Q 20/38* (2012.01)
  *G06Q 20/40* (2012.01)

(52) U.S. Cl.
  CPC ....... *G06Q 20/3827* (2013.01); *G06Q 20/401* (2013.01); *G06Q 2220/00* (2013.01)

(58) Field of Classification Search
  None
  See application file for complete search history.

(56) References Cited

U.S. PATENT DOCUMENTS 9,853,977 B1 * 12/2017 Laucius .............. H04L 63/0815
9,872,050 B2 *  1/2018 Uhr .................... H04N 21/2543
(Continued)

FOREIGN PATENT DOCUMENTS

CN      107357862 A    11/2017
CN      107247773 B     5/2018
(Continued)

OTHER PUBLICATIONS

Zhiqin Zhu et al. "Simulation Modelling Practice and Theory: Blockchain based consensus checking in decentralized cloud storage." (Jul. 2020). Retrieved online Jul. 20, 2024. (Year: 2020) https://scholar.google.com/scholar_url?url=https://www.sciencedirect.com/science/article/pii/S1569190X19301200&hl=en&sa=X&ei=nQScZtODFYWDy9YPguuSiQc&scisig=AFWwaeY7W-SAllldnJ71t68ErFzKR&oi=scholarr (Year: 2020).*
(Continued)

*Primary Examiner* — James A Reagan
(74) *Attorney, Agent, or Firm* — ANOVA LAW GROUP PLLC

(57) ABSTRACT

This application discloses a repeat transaction verification method and apparatus, a device, and a medium. The method includes a repeat transaction verifier being deployed in a first node, and the method includes acquiring a pending transaction to be stored on a blockchain; acquiring a bit array and K hash functions of the repeat transaction verifier, the bit array comprising M array elements and comprising first array elements; based on the K hash functions, mapping the pending transaction to K target identification locations of the bit array, identifying array elements on the K target identification locations as transaction mapping values on the K target identification locations; and obtaining a first repeat transaction verification result of the first repeat transaction verification based on an association between the first array
(Continued)

elements and the transaction mapping values on the K target identification locations.

18 Claims, 12 Drawing Sheets

(56) References Cited

U.S. PATENT DOCUMENTS

| | | | | |
|---|---|---|---|---|
| 9,875,510 | B1* | 1/2018 | Kasper | G06Q 40/12 |
| 9,882,715 | B2* | 1/2018 | Alness | G06Q 20/065 |
| 9,882,918 | B1* | 1/2018 | Ford | H04L 63/14 |
| 10,565,192 | B2* | 2/2020 | Garagiola | G06F 16/2453 |
| 10,691,665 | B1* | 6/2020 | Zhang | G06F 16/2315 |
| 10,691,676 | B1* | 6/2020 | Zhang | G06F 16/2379 |
| 10,929,374 | B2* | 2/2021 | Zhang | G06F 16/2246 |
| 10,985,919 | B2* | 4/2021 | He | H04L 9/50 |
| 11,108,555 | B2* | 8/2021 | He | G06F 21/64 |
| 11,113,676 | B2* | 9/2021 | Hanke | H04L 9/0643 |
| 11,188,977 | B2* | 11/2021 | Youb | G06Q 30/0645 |
| 11,468,077 | B2* | 10/2022 | Destefanis | H04L 67/1074 |
| 2017/0011460 | A1* | 1/2017 | Molinari | H04L 9/3247 |
| 2017/0076306 | A1* | 3/2017 | Snider | G06Q 30/0205 |
| 2017/0085545 | A1* | 3/2017 | Lohe | G06Q 20/10 |
| 2017/0091756 | A1* | 3/2017 | Stern | G06Q 20/36 |
| 2017/0109744 | A1* | 4/2017 | Wilkins | H04L 9/3236 |
| 2017/0243176 | A1* | 8/2017 | Hanke | G06Q 20/0655 |
| 2017/0330174 | A1* | 11/2017 | Demarinis | G06Q 20/3829 |
| 2017/0330180 | A1* | 11/2017 | Song | G06Q 20/401 |
| 2017/0330250 | A1* | 11/2017 | Arjomand | G06Q 20/027 |
| 2017/0344435 | A1* | 11/2017 | Davis | G06F 16/2379 |
| 2017/0344580 | A1* | 11/2017 | King | H04L 9/3247 |
| 2017/0346639 | A1* | 11/2017 | Muftic | H04L 9/3247 |
| 2018/0089041 | A1* | 3/2018 | Smith | H04L 9/3239 |
| 2018/0103042 | A1* | 4/2018 | Castagna | H04L 63/0428 |
| 2018/0113752 | A1* | 4/2018 | Derbakova | H04L 9/3239 |
| 2018/0114205 | A1* | 4/2018 | Thomas | G06Q 40/02 |
| 2018/0114261 | A1* | 4/2018 | Jayachandran | G06Q 30/0623 |
| 2020/0074565 | A1* | 3/2020 | Dotter | G06F 16/907 |
| 2020/0265516 | A1* | 8/2020 | Xu | H04L 9/50 |
| 2020/0278963 | A1* | 9/2020 | Destefanis | H04L 67/1093 |
| 2020/0320055 | A1* | 10/2020 | Zhang | G06F 16/22 |
| 2020/0320518 | A1* | 10/2020 | Simas | H04L 9/3247 |
| 2021/0051011 | A1* | 2/2021 | He | G06F 16/1834 |
| 2021/0083852 | A1* | 3/2021 | Destefanis | G06F 16/2465 |
| 2021/0119806 | A1* | 4/2021 | He | H04L 9/14 |
| 2021/0234683 | A1* | 7/2021 | He | G06F 21/64 |
| 2022/0005004 | A1* | 1/2022 | Xu | G06Q 20/0655 |
| 2023/0113492 | A1* | 4/2023 | Destefanis | G06F 16/2465 |
| | | | | 707/776 |

FOREIGN PATENT DOCUMENTS

| | | | |
|---|---|---|---|
| CN | 108874803 A | 11/2018 | |
| CN | 110503558 A | 11/2019 | |
| CN | 110880147 A | 3/2020 | |
| CN | 112667749 A | 4/2021 | |
| CN | 112950211 A | 6/2021 | |
| JP | 2020150428 A | * 9/2020 | G06Q 20/02 |
| JP | 2021077422 A | * 5/2021 | G06Q 20/02 |
| JP | 2021106020 A | * 7/2021 | G06Q 20/02 |
| JP | 2021131851 A | * 9/2021 | G06F 16/2365 |
| WO | 2019021107 A1 | 1/2019 | |
| WO | 2020177488 A1 | 9/2020 | |

OTHER PUBLICATIONS

Hassan Nasira et al. "Scalable Blockchains—A Systematic Review Muhammad." (Apr. 2021). Retrieved online Jul. 20, 2024. (Year: 2021) https://scholar.google.com/scholar_url?url=https://www.open-access.bcu.ac.uk/12221/1/Scalable_Blockchains_Survey_R1_CLEAN. pdf&hl=en&sa=X&ei=QwacZvfoGr2Uy9YPz4K56Qs&scisig= AFWwaeaAHM9wummpzElw9_d2RF6U&oi=scholarr (Year: 2021).*

Imran Bashir. "Mastering Blockchain Second Edition Copyright" (2018). Retrieved online Jul. 20, 2024. https://users.cs.fiu.edu/~prabakar/cen5079/Common/textbooks/Mastering_Blockchain_2nd_Edition.pdf (Year: 2018).*

Frederik Armknecht et al. "Ripple: Overview and Outlook." (Aug. 2015) Retrieved online Jul. 20, 2024. https://www.researchgate.net/publication/281631024_Ripple_Overview_and_Outlook (Year: 2015).*

The European Patent Office (EPO) The Extended European Search Report for 22806537.1 Mar. 26, 2024 39 Pages.

The World Intellectual Property Organization (WIPO) International Search Report for PCT/CN2022/090110 Jul. 6, 2022 7 Pages (including translation).

* cited by examiner

REPEAT TRANSACTION VERIFICATION METHOD, APPARATUS, AND DEVICE, AND MEDIUM

RELATED APPLICATIONS

This application is a continuation of PCT Application No. PCT/CN2022/090110, filed on Apr. 29, 2022, which in turn claims priority to Chinese Patent Application No. 2021105262053, filed with the National Intellectual Property Administration, PRC on May 14, 2021 and entitled "REPEAT TRANSACTION VERIFICATION METHOD, APPARATUS, AND DEVICE, AND MEDIUM." The two applications are incorporated herein by reference in their entirety.

FIELD OF THE TECHNOLOGY

This application relates to the field of computer technologies, and in particular to a repeat transaction verification technology.

BACKGROUND OF THE DISCLOSURE

Due to a limited node internal memory of a blockchain node in a blockchain system, the number of transactions that can be cached by a transaction cache located in the node internal memory is also limited. Accordingly, after successfully writing the transactions in the transaction cache into the blockchain, the blockchain node in the blockchain system often clears transactions that have been successfully stored on the blockchain from the transaction cache of the node internal memory, thereby avoiding continually occupying the node internal memory by such transactions.

However, frequent access to the blockchain database will affect its query performance, thus reducing the speed of repeat transaction verification in the blockchain database, that is, reducing the efficiency of repeat transaction verification for the blockchain node.

SUMMARY

This application provides a repeat transaction verification method and apparatus, a device, and a medium, which may improve the efficiency of repeat transaction verification. One aspect of this application provides a repeat transaction verification method, the method is performed by a first node in a blockchain network, and a repeat transaction verifier is deployed in the first node. The method includes acquiring a pending transaction to be stored on a blockchain of the blockchain network; acquiring a bit array and K hash functions of the repeat transaction verifier during first repeat transaction verification performed on the pending transaction by the repeat transaction verifier and identifying the acquired bit array as a bit array to be queried corresponding to the pending transaction, the bit array to be queried comprising M array elements, the M array elements comprising first array elements, M being an integer greater than 1 and K being a positive integer less than M; based on the K hash functions, mapping the pending transaction to K target identification locations of the bit array, among the M array elements, identifying array elements on the K target identification locations as transaction mapping values on the K target identification locations; and obtaining a first repeat transaction verification result of the first repeat transaction verification performed on the pending transaction based on an association between the first array elements and the transaction mapping values on the K target identification locations.

Another aspect of this disclosure provides a computer device is provided, including a processor and a memory, the processor being connected to the memory, the memory being configured to store a computer program, the computer program, when executed by the processor, causing the computer device to perform the method provided in embodiments of this disclosure.

Another aspect of this disclosure provides a non-transitory computer-readable storage medium, storing a computer program, the computer program, suitable for being loaded and executed by a processor to cause a computer device with the processor to perform the method provided in embodiments of this disclosure.

The computer device (for example, the first node in the blockchain network) in one embodiment is equipped with a repeat transaction verifier for performing repeat transaction verification. Upon acquiring a pending transaction, the computer device may perform first repeat transaction verification on the pending transaction by the repeat transaction verifier in advance. At this time, the computer device may acquire a bit array and K hash functions of the repeat transaction verifier, so as to take the acquired bit array as a bit array to be queried corresponding to the pending transaction. M array elements in the bit array to be queried herein include first array elements, where K is a positive integer less than M and M is the array length of the bit array to be queried. Further, based on the K hash functions, the computer device may map the pending transaction to K target identification locations of the bit array to be queried; and among the M array elements, take array elements on the K target identification locations as transaction mapping values on the K target identification locations. It can be understood that one hash function may map the pending transaction to a point in the bit array to be queried, and the identification location of this point is a target identification location of the aforementioned bit array to be queried. Further, the computer device may determine an association between the first array elements and the transaction mapping values on the K target identification locations; and based on the association, obtain a first repeat transaction verification result of the first repeat transaction verification performed on the pending transaction. It can be seen from one embodiment that when the pending transaction is acquired, whether the pending transaction exists in the node internal memory of the first node may be determined in advance by the repeat transaction verifier and a determined result may be used as the first repeat transaction verification result of the pending transaction. In one embodiment, through performing repeat transaction verification in the node internal memory by using the repeat transaction verifier, whether the pending transaction exists may be rapidly determined directly by the association between the first array elements in the bit array to be queried and the transaction mapping values on the K target identification locations, thereby improving the efficiency of repeat transaction verification.

DESCRIPTION OF EMBODIMENTS

The technical solutions in this application are clearly and completely described in the following with reference to the accompanying drawings in this application. Apparently, the described embodiments are merely some rather than all of the embodiments of this application. All other embodiments obtained by a person of ordinary skill in the art based on the embodiments of this application without creative efforts shall fall within the protection scope of this application.

Often, after receiving a transaction (for example, a transaction T), the blockchain node (for example, a node A) in the blockchain system needs to perform repeat transaction verification on this transaction T, that is, whether the transaction T has already existed in the transaction cache of the node A and a blockchain database associated with the node A is queried. It means that, in an existing repeat transaction verification solution, when the repeat transaction verification is performed on any transaction based on the transaction cache, it is necessary to further request to access the blockchain database by a blockchain network if this transaction is not found in the transaction cache, so as to query whether this transaction exists in the blockchain database. It can be seen therefrom that existing repeat transaction verification solutions involve the access of the blockchain node to the blockchain database. If the blockchain node receives multiple transactions (for example, a same transaction frequently transmitted by a blockchain client), the blockchain database is to be accessed for multiple times.

Figure 1:
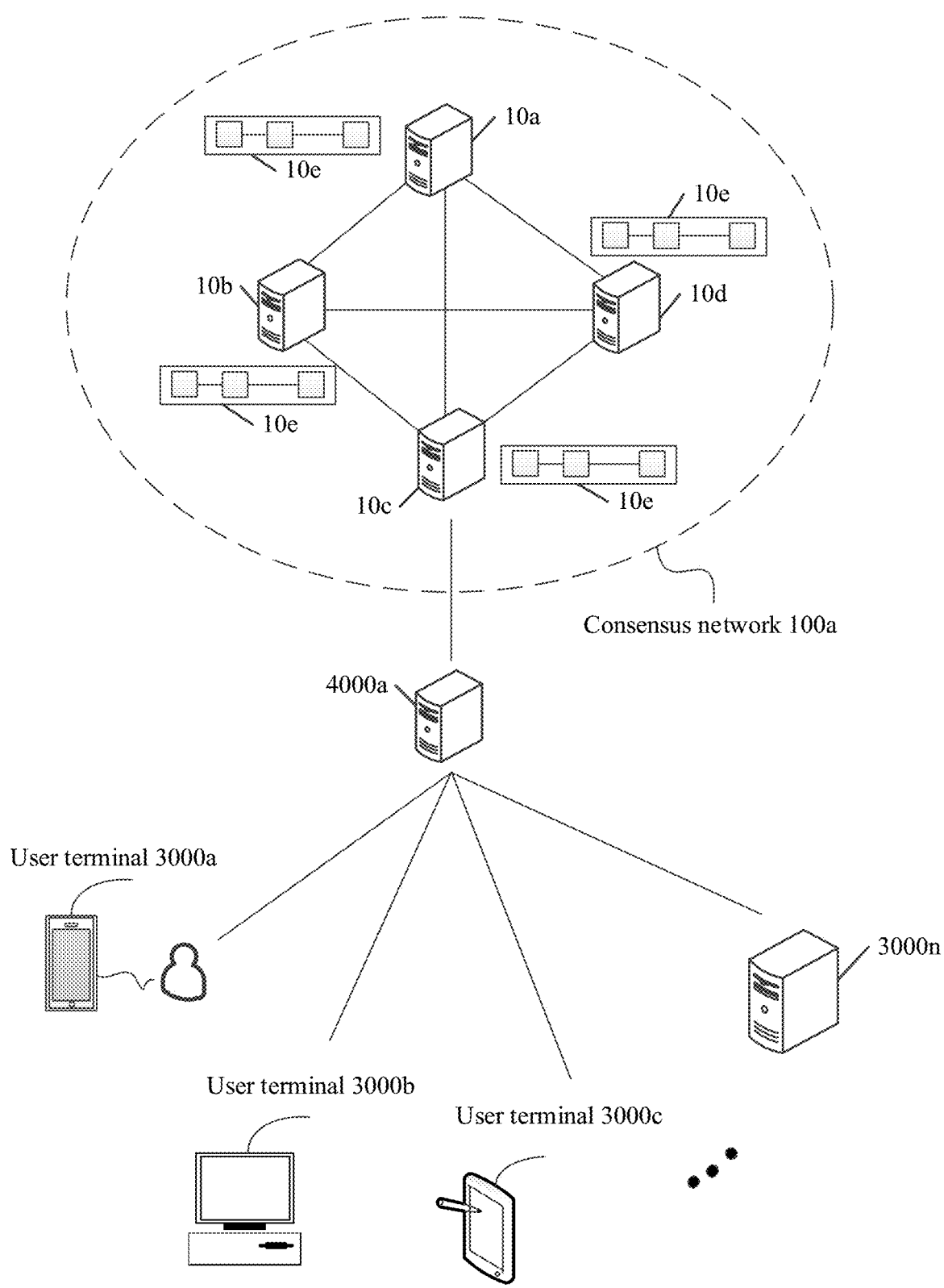
FIG. 1 is a schematic diagram of a network architecture provided by one embodiment.

FIG. 1 is a schematic diagram of a network architecture according to one embodiment. The network architecture shown in FIG. 1 may be applied to a blockchain system, and the blockchain system may be a distributed system formed by connecting a plurality of nodes in a network communication way. The blockchain system may include, but is not limited to, a blockchain system corresponding to a consortium blockchain.

As a new application mode of computer technologies, such as distributed data storage, point-to-point transmission, consensus mechanism and encryption algorithm, a blockchain is used for sorting out data in a chronological order and encrypt such data into ledgers, thereby preventing the data from being tampered and falsified. In addition, processing such as data verification, storage and update may be supported. Essentially, the blockchain is a decentralized database, and each node in such database stores an identical blockchain. A blockchain network divides these nodes into a core node and light nodes, where the core node may be responsible for the consensus of the whole blockchain network, that is, the core node may be a consensus node in the blockchain network. It is to be understood that after any node (for example, a light node) in the blockchain network receives transaction data (also referred to as transaction for short) transmitted by a client, the transaction may be transferred among the light nodes in the blockchain network in a baton passing manner. After receiving the transaction, the consensus node (i.e. a master core node in the blockchain network) used for packaging in the blockchain network may further add the transaction to a transaction pool of the master core node, so that the master core node can subsequently package the transaction and other transactions in the transaction pool into a block, and furthermore, a packaged block (i.e. a target block) is broadcasted to other consensus nodes (i.e. slave core nodes in the blockchain network) in the blockchain network, thereby implementing block consensus of the target block by using other consensus nodes. After these consensus nodes reach a consensus, the target block is written into a local ledger (for example, written into a transaction cache of a node internal memory), so that the target block may be subsequently written into a blockchain database (also referred to as a database for short) corresponding to a target blockchain in the blockchain network. The target blockchain herein may be understood as a longest blockchain constructed by these consensus nodes according to the consensus mechanism.

The blockchain system may include a smart contract. The smart contract may be understood as a code which may be understood and executed among all nodes (including the consensus node) in the blockchain, and may execute arbitrary logic and obtain results. A user may initiate a transaction adding request for a certain transaction to any node in the blockchain network through the blockchain client. After that, the node (for example, the slave core node or light node) in the blockchain network may transmit a transaction carried in the transaction adding request to the master core node, such that prior to calling the smart contract to execute the transaction requested by the user, the master core node determines whether the currently received transaction has already existed in the blockchain network in advance. If the transaction has already existed in the blockchain network, the transaction in the transaction adding request may be refused to be received (that is, the transaction is a repeat transaction). Otherwise, if the transaction does not exist in the blockchain network, the transaction in the transaction adding request may be allowed to be received (that is, the transaction is a non-repeat transaction).

For example, to prevent a certain core node from receiving transactions transmitted by malicious nodes or prevent a transaction retransmitted by a blockchain client because of not receiving a reply for the transaction by the core node due to network delay, and the core node in one embodiment needs to perform first repeat transaction verification on the transaction in the node internal memory of the core node in advance by a repeat transaction verifier after the core node acquires the transaction requested by the user, so as to determine whether to refuse to receive the transaction. In other words, the core node may rapidly determine whether the currently acquired transaction is a repeat transaction in the node internal memory by the repeat transaction verifier. If a repeat transaction verification result (i.e., a first repeat transaction verification result) determined by the repeat transaction verifier indicates that the currently acquired transaction is a repeat transaction, the transaction in the transaction adding request may be refused to be received. Otherwise, if the repeat transaction verification result determined by the repeat transaction verifier indicates that the currently acquired transaction is not a repeat transaction, it may be further determined that second repeat transaction verification is required for the currently acquired transaction, then the second repeat transaction verification may be performed successively by the transaction pool, the transaction cache and the blockchain database of the node internal memory, such that the transaction pool, the transaction cache and the blockchain database may collaboratively determine whether the currently acquired transaction has already existed in the blockchain network. If the currently acquired transaction has already existed in the blockchain network, it may be finally determined that the currently acquired transaction is a repeat transaction, and the repeat transaction is refused to be received. Otherwise, if it is finally determined that the currently acquired transaction is a non-repeat transaction after twice repeat transaction verification, the non-repeat transaction may be added to the transaction pool.

It is to be understood that the blockchain system may include one or more smart contracts, and these smart contracts may be distinguished by contract calling address, contract identity document (ID) or contract name. In addition, the transaction adding request initiated by the blockchain client may also carry the contract calling address, the contract ID or the contract name of a smart contract, so as to specify the smart contract to be run. If the smart contract specified by the blockchain client is a contract needing to read data (i.e. a data reading contract), upon the completion of the repeat transaction verification, each consensus node may call the data reading contract to rapidly access the local ledger while further executing a transaction (for example, each consensus node may rapidly access a multi-level block cache constructed by a block-chain structure in the node internal memory, where the multi-level block cache is obtained by arraying block caches of each block in accordance with an indexing mode of block hash values of each block cached in the node internal memory of each consensus node; one block cache may be used for storing a transaction read cache and a transaction write cache of each transaction in one block), and read corresponding data. Finally, all the consensus nodes may mutually verify whether all transaction execution results for the transaction are consistent (that is, consensus processing is performed). If the transaction execution results are consistent, it may be determined that the transaction is a legal one, and the transaction execution result of the legal transaction may be stored into the transaction write cache of respective local ledger, and the transaction execution result of the transaction may be returned back to the blockchain client.

It is to be understood that the network architecture shown in FIG. 1 may include a core node (i.e., consensus node) cluster, a light node cluster and a user terminal cluster. The core node cluster may include one or more core nodes, and the multiple core nodes herein may specifically include a node 10*a*, a node 10*b*, a node 10*c* and a node 10*d* shown in FIG. 1. As shown in FIG. 1, the node 10*a*, the node 10*b* and the node 10*d* may establish a network connection with the node 10*c* respectively, so as to form a consensus network 100*a* shown in FIG. 1. In the consensus network 100*a*, the node 10*a*, the node 10*b* and the node 10*d* may perform data interaction through the network connection with the node 10*c*. In addition, the light node cluster may include one or more light nodes. In order to facilitate the comprehension, one light node is taken as an example herein, and the light node is a node 4000*a* shown in FIG. 1. The node 4000*a* may perform data interaction through the network connection with the node 10*c* shown in FIG. 1. In addition, the user terminal cluster shown in FIG. 1 may include one or more user terminals, and the multiple user terminals herein may specifically include a user terminal 3000*a*, a user terminal 3000*b*, a user terminal 3000*c*, . . . , and a user terminal 3000*n* shown in FIG. 1. As shown in FIG. 1, the user terminal 3000*a*, the user terminal 3000*b*, the user terminal 3000*c*, . . . , and the user terminal 3000*n* may each establish a network connection with the node 4000*a* in the light node cluster respectively, so that each user terminal may perform data interaction through the network connection with the node 4000*a*.

In one embodiment, each core node (for example, the node 10*a*, the node 10*b*, the node 10*c* and the node 10*d*) in the consensus network 100*a* and each light node in the light node cluster are collectively referred to as blockchain nodes. All the blockchain nodes herein may receive a transaction adding request transmitted by a user terminal on which the blockchain client is run. It is to be understood that each core node herein may maintain the same blockchain (for example, a blockchain 10*e* shown in FIG. 1 may be a target blockchain maintained by each core node in the blockchain network). Any two core nodes in the consensus network 100*a* may form a peer to peer (P2P) network which may employ a P2P protocol. The P2P protocol is an application layer protocol run on a transmission control protocol (TCP). Any device such as a server or a terminal may be added to the distributed system to become a blockchain node. Each blockchain node may include a hardware layer, an intermediate layer, an operating system layer, and an application layer.

In one embodiment, a blockchain node may be bound to any role (for example, any individual user, any enterprise, any institution and other entity objects) accessing the blockchain network, and blockchain networks composed of these blockchain nodes are collectively referred to as consortium blockchain networks. As a result, the node 10*a*, the node 10*b*, the node 10*c* and the node 10*d* shown in FIG. 1 and corresponding roles (i.e., entity objects under corresponding business scenarios) accessing the blockchain network may form one-to-one correspondence. The business scenarios herein may include an electronic bill scenario, a social scenario, a buying-on-credit scenario, a credit scenario, etc. At this time, target businesses under corresponding business scenarios may specifically include an electronic bill business, a social business, a buying-on-credit business, a credit business, etc. The specific businesses under corresponding business scenarios are not listed one by one herein.

Since each entity object may correspond to one blockchain node, one embodiment may take the entity object being an enterprise user (i.e., the enterprise) as an example. At this time, the blockchain node associated with each enterprise user may be the same blockchain node (for example, the node 4000*a* shown in FIG. 1 may perform data interaction with user terminals corresponding to multiple enterprise users). For example, electronic bill businesses (for example, a registration business, a billing business, a bill transferring business, etc.) corresponding to each billing enterprise may be collectively referred to as transactions in a blockchain-based electronic bill system. A billing enterprise A may perform data interaction with the node 4000a shown in FIG. 1 through the user terminal 3000a shown in FIG. 1 to complete a corresponding transaction. By parity of reasoning, a billing enterprise B may perform data interaction with the node 4000a shown in FIG. 1 through the user terminal 3000b shown in FIG. 1 to complete a corresponding transaction; and a billing enterprise C may perform data interaction with the node 4000a shown in FIG. 1 through the user terminal 3000c shown in FIG. 1 to complete a corresponding transaction.

In one embodiment, the entity objects (for example, the billing enterprise A, the billing enterprise B, . . . , and the billing enterprise C) transmitting a transaction adding request in the electronic bill businesses may be collectively referred to as request users. It is to be understood that in one embodiment, a transaction adding request transmitted by the request user (for example, the billing enterprise A, the billing enterprise B, . . . , and the billing enterprise C) may be received by the light node or the transaction adding request transmitted by the request user (for example, the billing enterprise A, the billing enterprise B, . . . , and the billing enterprise C) may be received by the core node. The node types of blockchain nodes used for receiving the transaction adding request are not limited herein.

In some embodiments, in the consensus network 100a, the node 10c may synchronize data with other blockchain nodes which has a network connection (also referred to as session connection) with the node 10c, that is, the node 10c may synchronize corresponding business data information from the other blockchain nodes (for example, the business data information herein may include, but is not limited to, transactions in the transaction adding request, blocks in a block synchronization request, etc.). At this time, core nodes associated with each enterprise user may be different blockchain nodes. For example, the billing enterprise A may perform data interaction with the node 10c shown in FIG. 1 through the user terminal 3000a shown in FIG. 1; the billing enterprise B may also perform data interaction with the node 10b shown in FIG. 1 through the user terminal 3000b shown in FIG. 1; and the billing enterprise C may also perform data interaction with the node 4000a shown in FIG. 1 through the user terminal 3000c shown in FIG. 1. It is to be understood that a network load in the blockchain network may be effectively balanced by randomly allocating transaction adding requests transmitted by different user terminals to the blockchain nodes in the blockchain system, thereby improving the efficiency of processing business data of corresponding businesses.

It can be understood that when a light node receives a transaction adding request transmitted by a request user corresponding to the blockchain client, the transaction adding request transmitted by the request user may be forwarded to the master core node, so as to perform repeat transaction verification on a transaction in the transaction adding request transmitted by the request user through the master core node. After the repeat transaction verification passes, the master core node may add the transaction requested by the request user (i.e., a legal non-repeat transaction) to a transaction pool, so that transaction data associated with the transaction is subsequently packaged into a block to perform consensus with other consensus nodes (i.e., the slave core nodes). After a consensus is reached, the block carrying the transaction data of the transaction is temporarily stored in the local ledger, thereby writing the block carrying the transaction data into the blockchain database (also referred to as a database for short).

Figure 2:
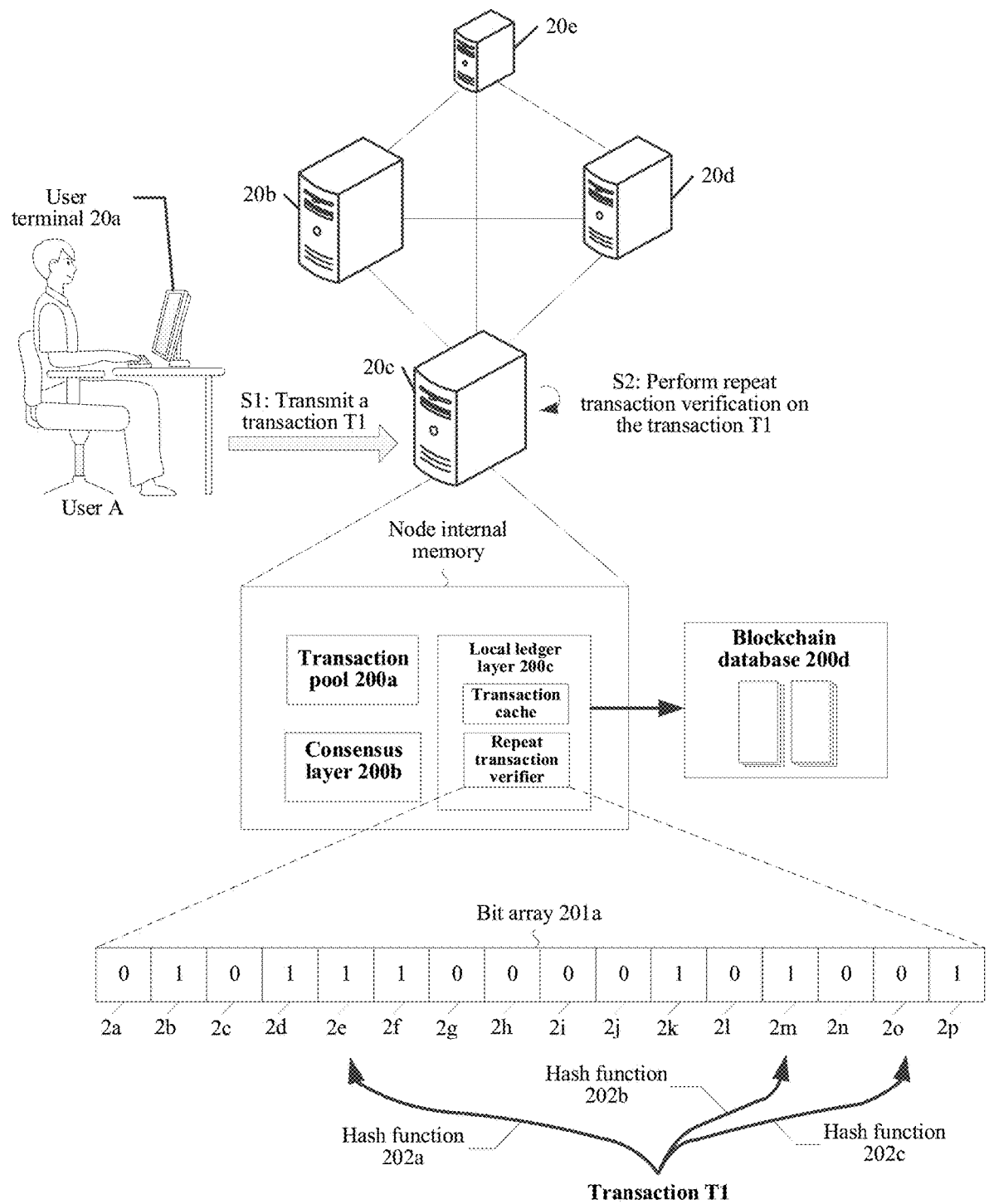
FIG. 2 is a schematic scenario diagram of performing repeat transaction verification in a node internal memory provided by one embodiment.

In order to facilitate the comprehension, further, reference is made to FIG. 2. FIG. 2 is a schematic scenario diagram of performing repeat transaction verification in a node internal memory provided by one embodiment. A user A (i.e., the request user) shown in FIG. 2 may perform step S1 through a user terminal 20a shown in FIG. 2 to transmit a transaction T1 (for example, the transaction T1 may be an invoicing business that the user A issue an electronic invoice to an enterprise B) requested by the user A to a node 20c shown in FIG. 2. The node 20c may perform step S2 after receiving the transaction T1 transmitted by the user terminal 20a to perform repeat transaction verification on the transaction T1. In one embodiment, a blockchain node that currently receives the transaction T1 (for example, the node 20c shown in FIG. 2) may be collectively referred to as a first node, and other nodes (for example, a node 20b, a node 20d, a node 20e and the like shown in FIG. 2) in the blockchain network may be collectively referred to as second nodes. As shown in FIG. 2, the node 20c (i.e., the first node) may receive the transaction T1 in the transaction adding request transmitted by the user terminal 20a on which a blockchain client is run, or may receive transactions in target blocks broadcasted by other nodes (i.e., the second nodes) in the blockchain network. No matter the node 20c receives the transaction in the transaction adding request or receives the transactions in the target blocks broadcasted by the other nodes, step S2 shown in FIG. 2 may be performed, so as to perform repeat transaction verification on the currently received transaction and determine whether the currently received transaction exists in the blockchain network.

A repeat transaction verifier shown in FIG. 2 includes an oversize bit array and K hash functions, and the array length of the oversize bit array may be M, where K may be a positive integer less than M. In one embodiment, after the node 20c acquires the transaction T1, repeat transaction verification may be performed on the transaction T1 by the repeat transaction verifier to obtain a first repeat transaction verification result.

A bit array 201a shown in FIG. 2 may include M array elements, and the M array elements can be represented by using a very long binary vector. The binary vector herein may be a vector (i.e., 0101110000101001) with the array length of M (for example, M=16), as shown in FIG. 2 As shown in FIG. 2, there may be array elements with the numerical value of 0 or array elements with the numerical value of 1 in the M array elements of the bit array 201a. In order to facilitate the comprehension, in one embodiment, the array elements with the numerical value of 0 may be collectively referred to as first array elements of the bit array, and the array elements with the numerical value of 1 may be collectively referred to as second array elements of the bit array. As shown in FIG. 2, each array element corresponds to an identification location. For example, the identification locations of these array elements may respectively be identification location 2a to identification location 2p shown in FIG. 2. The array element corresponding to the identification location 2a is 0 and the array element corresponding to the identification location 2b is 1. By parity of reasoning, the array element corresponding to the identification location 2o is 0 and the array element corresponding to the identification location 2p is 1. It is to be understood that the value of M herein may be adjusted according to requirements in the blockchain system, that is, the value of M is not limited in one embodiment.

In order to facilitate the comprehension, one embodiment takes the situation that the K hash functions of the repeat transaction verifier are 3 hash functions as an example, and the 3 hash functions may specifically be a hash function 202a, a hash function 202b and a hash function 202c shown in FIG. 2. As shown in FIG. 2, the hash function 202a may be used for performing hash calculation (for example, hash location mapping) on a hash value (for example, a hash value 1) of the transaction T1 shown in FIG. 2, so as to map the transaction T1 to a point (for example, a point 1, and the point 1 may be a bit) in the bit array 201a. A target identification location corresponding to the point 1 may be an identification location 2e, and the array element on the identification location 2e is the second array element. Similarly, as shown in FIG. 2, the hash function 202b may be used for performing hash calculation (for example, hash location mapping) on the hash value (for example, the hash value 1) of the transaction T1 shown in FIG. 2, so as to map the transaction T1 to another point (for example, a point 2, and the point 2 may be another bit) in the bit array 201a. A target identification location corresponding to the point 2 may be an identification location 2m, and the array element on the identification location 2m is the second array element. Similarly, as shown in FIG. 2, the hash function 202c may be used for performing hash calculation (for example, hash location mapping) on the hash value (for example, the hash value 1) of the transaction T1 shown in FIG. 2, so as to map the transaction T1 to still another point (for example, a point 3, and the point 3 may be a bit) in the bit array 201a. A target identification location corresponding to the point 3 may be the identification location 2o, and the array element on the identification location 2o is the first array element. It is to be understood that a specific implementation for performing hash calculation (for example, hash location mapping) on the hash value of the transaction T1 through the K hash functions herein may include, but is not limited to, performing modulo operation on the hash value of the transaction T1, so as to map the transaction T1 to the target identification location in the bit array 201a according to a one-to-one mapping relationship between a calculated remainder and the identification location in the bit array 201a.

It can be seen from one embodiment that after acquiring the transaction T1, the node 20c may perform hash calculation on transaction data (also referred to as transaction content) of the transaction T1 to obtain a transaction hash value (for example, the hash value 1) for uniquely identifying the transaction T1. Further, the node 20c may take the transaction hash value (for example, the hash value 1) of the transaction T1 as an input value of the repeat transaction verifier (the repeat transaction verifier is deployed in the node internal memory of the node 20c) as shown in FIG. 2, such that the repeat transaction verifier may be able to perform hash calculation (for example, the hash modulo operation) on the input value again through the K hash functions (for example, the hash function 202a, the hash function 202b and the hash function 202c) respectively, so as to obtain K bits (i.e. the identification location 2e, the identification location 2m and the identification location 2o) associated with the transaction T1. It is to be understood that in one embodiment, array elements on the K bits (i.e., K target identification locations) are collectively referred to as transaction mapping values.

The repeat transaction verifier herein may be understood as a filter with a repeat transaction verification function (for example, the repeat transaction verifier may include, but is not limited to, a Bloom filter). The repeat transaction verifier may fundamentally avoid repeat transactions frequently transmitted by malicious nodes, thereby preventing these repeat transactions from wasting a limited resource space of the node internal memory of the node 20c. The repeat transaction verifier herein may be used for maintaining a repetition verification set, but may not store a repetition verification element that has been inserted in the repetition verification set (that is, when the node 20c needs to insert a certain transaction as a repetition verification element into the repetition verification set of the repeat transaction verifier, the array elements on the K identification locations corresponding to the repetition verification element will be set to 1 to obtain the bit array 201a shown in FIG. 2), which is more safer for transactions with certain privacy.

The K hash functions in the repeat transaction verifier are independent of one another. As a result, after acquiring the transaction T1, the node 20c may directly execute the K hash functions concurrently through hardware of the node 20c. Accordingly, the transaction T1 shown in FIG. 2 is mapped to the K target identification locations of the bit array 201a through the K hash functions, and furthermore, the first repeat transaction verification result may be obtained according to an association between the first array elements in the repeat transaction verifier and the mapping values on the K target identification locations. It can be seen that currently acquired repeat transactions may be rapidly filtered in the node internal memory through the repeat transaction verifier shown in FIG. 2. Accordingly, not only can a limited resource space in the node internal memory be saved, but also the query pressure of the blockchain database in the blockchain network can be reduced to a certain extent. As shown in FIG. 2, there are transaction mapping values identical to the first array elements in the transaction mapping values of the transaction T1 on 3 target identification locations, so that it may be directly determined that the transaction T1 does not exist in the repetition verification set, that is, it may be directly determined that the transaction T1 is a non-repeat transaction. Then, the transaction T1 may be added to a transaction pool 200a shown in FIG. 2 for storage directly in the node internal memory, without the need of accessing the blockchain database shown in FIG. 2, which may improve the speed of repeat transaction verification.

If one or more transaction mapping values in the K transaction mapping values are identical to the first array elements, a first association between the first array elements and the transaction mapping values on the K target identification locations may be obtained. The first association is used for reflecting that the transaction T1 does not exist in the repetition verification set of the repeat transaction verifier, so as to directly consider the transaction T1 as a non-repeat transaction. Therefore, the transaction T1 transmitted by the user terminal 20a shown in FIG. 2 may be received, and then the transaction T1 is added to the transaction pool 200a. It is to be understood that after adding the transaction T1 to the transaction pool 200a by the node 20c, the node 20c may also inert the transaction T1 into the repeat transaction verifier as a repetition verification element. That is to say, at this time, the node 20c may change array elements (i.e. an array element on the identification location 2e, an array element on the identification location 2m and an array element on the identification location 2o) on the K target identification locations corresponding to the repetition verification element in the bit array 201a (i.e. a bit array to be queried corresponding to the transaction T1) shown in FIGS. 2 to 1, so as to obtain a new bit array. The new bit array may be used as a bit array to be queried for a next transaction.

In some embodiments, with regard to another transaction (for example, a transaction T2) transmitted by other user terminals, repeat transaction verification may also be performed on the transaction T2 through the repeat transaction verifier shown in FIG. 2. That is, an association between the first array elements and K transaction mapping values of the transaction T2 may be determined. Similarly, if the association is the first association, the transaction T2 may also be added to the transaction pool 200a and array elements on the K target identification locations corresponding to the transaction T2 are changed to 1. That is, the array elements on the K target identification locations corresponding to the transaction T2 are all set to be second array elements, so as to insert the transaction T2 into the repetition verification set of the repeat transaction verifier as a repetition verification element.

Otherwise, if all transaction mapping values in the K transaction mapping values are different from the first array elements, a second association between the first array elements and the transaction mapping values on the K target identification locations may be obtained. The second association is used for reflecting that another transaction (for example, the transaction T2) transmitted by other user terminals may exist in the repetition verification set of the repeat transaction verifier, that is, the transaction T2 may be a repeat transaction. In this case, whether the transaction T2 is a repeat transaction cannot be accurately determined, because the array elements in the bit array of the repeat transaction verifier are shared and there may be a condition that array elements on the same identification location are shared to different repetition verification elements in the repetition verification set. Accordingly, in one embodiment, in order to ensure the reliability of repeat transaction verification, whether there is a first historical transaction matching with the transaction T2 may be further searched in the transaction pool 200a shown in FIG. 2. If the first historical transaction is not found, whether there is a second historical transaction matching with the transaction T2 may be further searched in a transaction cache shown in FIG. 2. If the second historical transaction is still not found, a blockchain database 200d shown in FIG. 2 may be accessed by the blockchain network to finally determine whether the transaction T2 is a non-repeat transaction. It is to be understood that if a third historical transaction matching with the transaction T2 is also not found in the blockchain database 200d, it may be finally determined that the transaction T2 is a non-repeat transaction, that is, the transaction T2 does not exist in the entire blockchain network. Therefore, the node 20c may be allowed to add the transaction T2 to the transaction pool 200a shown in FIG. 2, such that transactions in the transaction pool 200a may be subsequently packaged by a consensus layer 200b of the node 20c to form the target block. Then, block consensus is performed on the target block through other nodes (for example, a consensus node 20b, a consensus node 20d and a consensus node 20e) shown in FIG. 2. After a block consensus is reached, the target block is temporarily stored in the transaction cache shown in FIG. 2, such that the transactions and transaction execution results in the target block are subsequently stored in the blockchain database 200d shown in FIG. 2 after the target block in the transaction cache is stored on the target blockchain.

In one embodiment, the first association or the second association herein may be collectively referred to as a first repeat transaction verification result obtained by performing first repeat transaction verification on a pending transaction. In addition, a repeat transaction verification result finally obtained by the transaction pool 200a, a transaction cache of a local ledger layer 200c or the blockchain database 200d may be collectively referred to as a second repeat transaction verification result.

For the specific process of performing repeat transaction verification on transactions in a received transaction adding request and transactions in a received block by the first node (for example, the node 20c shown in FIG. 2), reference may be made to the embodiments corresponding to FIG. 3 to FIG. 10 below.

Figure 3:
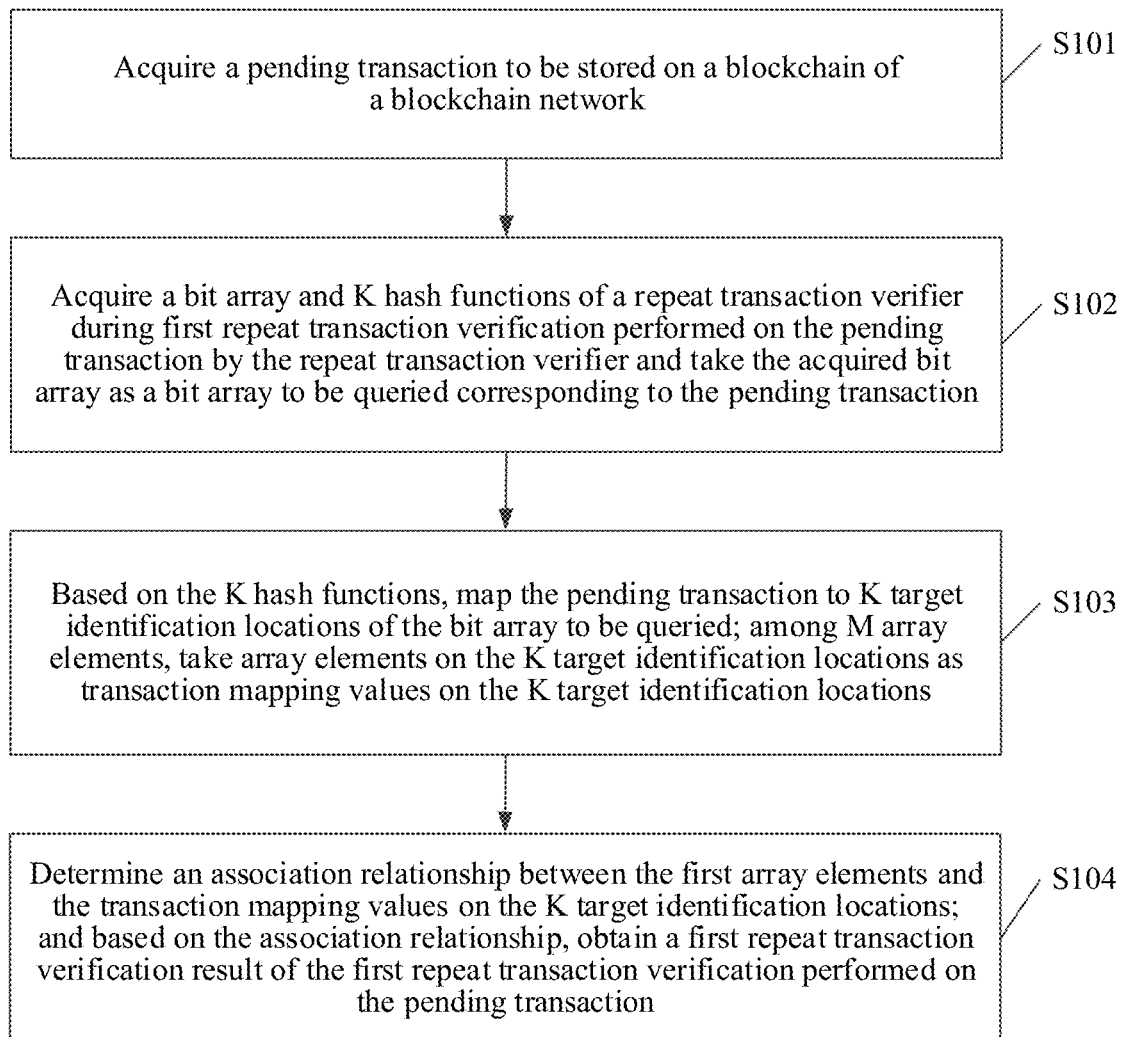
FIG. 3 is a schematic flowchart of a repeat transaction verification method provided by this application.

Further, reference is made to FIG. 3. FIG. 3 is a schematic flowchart of a repeat transaction verification method provided by this application. As shown in FIG. 3, the method may be performed by the first node in the blockchain network, and a repeat transaction verifier is deployed in the first node. It is to be understood that the first node may be any node in the consensus network 100a shown in FIG. 1. The method may specifically include the following step S101 to step S104.

Step S101: Acquire a pending transaction to be stored on a blockchain of a blockchain network.

Specifically, while a certain transaction is acquired, the first node may consider the acquired transaction as the pending transaction. The first node may further determine a transaction source attribute of the pending transaction, so as to perform repeat transaction verification on the pending transaction by using different repeat transaction verification policies according to different transaction source attributes.

The transaction herein may be from a first source, and the first source indicates a transaction adding request transmitted by a blockchain client. The transaction herein may also be from a second source, and the second source indicates a block broadcasted by other nodes, or may be from a third source, and the third source indicates transactions in a transaction pool synchronized from other nodes. In order to facilitate the comprehension, in one embodiment, the source attributes of the first source and the third source may be collectively referred to as a first source attribute, and the source attribute of the second source may be collectively referred to as a second source attribute. The first source attribute may be used for characterizing that the pending transaction is a transaction (for example, a transaction Tx1) in the transaction adding request transmitted by the blockchain client. In some embodiments, the first source attribute may also be used for characterizing that the pending transaction is a transaction (for example, a transaction Tx2) synchronized from a transaction pool of a second node. The second source attribute may be used for characterizing that the pending transaction is a transaction in a block (for example, the transaction in the block may specifically include a transaction 1, a transaction 2, ..., and a transaction N) transmitted by the second node (for example, other consensus nodes in the blockchain network).

Accordingly, if the transaction source attribute determined is the first source attribute, a first repeat transaction verification policy and/or a second repeat transaction verification policy may be adopted to perform repeat transaction verification on the pending transaction. For example, the first repeat transaction verification policy may be adopted to perform the following step S102 to step S104, so as to perform first repeat transaction verification on a transaction currently acquired by the first node.

In some embodiments, if the transaction source attribute determined is the second source attribute, a third repeat transaction verification policy and/or a fourth repeat transaction verification policy may be adopted to perform repeat transaction verification on the transaction in the target block For example, the first node may control the repeat transaction verifier to transverse each transaction (i.e. the transaction 1, the transaction 2, . . . , and the transaction N) in the block (i.e. the target block) in advance based on the third repeat transaction verification policy to perform repeat transaction verification, thereby obtaining a block repeat transaction verification result of the target block.

If it is determined that each transaction in the target block is not a repeat transaction (that is, each transaction in the target block is a non-repeat transaction) when repeat transaction verification is performed on the transactions in the target block by the repeat transaction verifier, the target block may be received, and then array elements on corresponding target identification locations in a bit array (i.e. the bit array to be queried) in the repeat transaction verifier of the first node may be changed to 1 according to hash mapping values on target identification locations of all transactions in the target block. Otherwise, once it is determined that a certain transaction in the target block might be a repeat transaction when repeat transaction verification is performed on the transactions in the target block by the repeat transaction verifier, repeat transaction verification may be performed on the transaction again in a transaction cache and a blockchain ledger based on the fourth repeat transaction verification policy, which avoids mistakenly identifying the transaction in the target block as a repeat transaction.

In order to facilitate the comprehension, the situation that a transaction source attribute determined by the first node is the first source attribute is taken as an example herein, at this time, the first node may perform the following step S102 based on the first source attribute by using the first repeat transaction verification policy.

Step S102: Acquire a bit array and K hash functions of the repeat transaction verifier during first repeat transaction verification performed on the pending transaction by the repeat transaction verifier and take the acquired bit array as a bit array to be queried corresponding to the pending transaction.

The bit array to be queried includes M array elements, and the M array elements include first array elements; M is the array length of the bit array to be queried and is an integer greater than 1, and K is a positive integer less than M.

Specifically, during the first repeat transaction verification performed on the pending transaction by the repeat transaction verifier based on the first repeat transaction verification policy, the first node may acquire a bit array with an array length of M from the repeat transaction verifier, and acquire K hash functions associated with the bit array with the array length of M; in the bit array with the array length of M, all array elements on K key identification locations, which are mapped by repetition verification elements in a repetition verification set of the repeat transaction verifier, are second array elements (the second array elements herein may be the array elements with the value of 1); one key identification location is an identification location obtained by performing hash location mapping on the repetition verification elements by one hash function. Further, in the bit array with the array length of M, the first node may take array elements except the second array elements in the M array elements as the first array elements (the first array elements herein may be the array elements with the value of 0); identification locations corresponding to the first array elements are different from identification locations corresponding to the second array elements, and the sum of the quantity of elements of the first array elements and the quantity of elements of the second array elements is M. Further, the first node may take a bit array composed of the first array elements and the second array elements as the bit array to be queried corresponding to the pending transaction.

Figure 4:
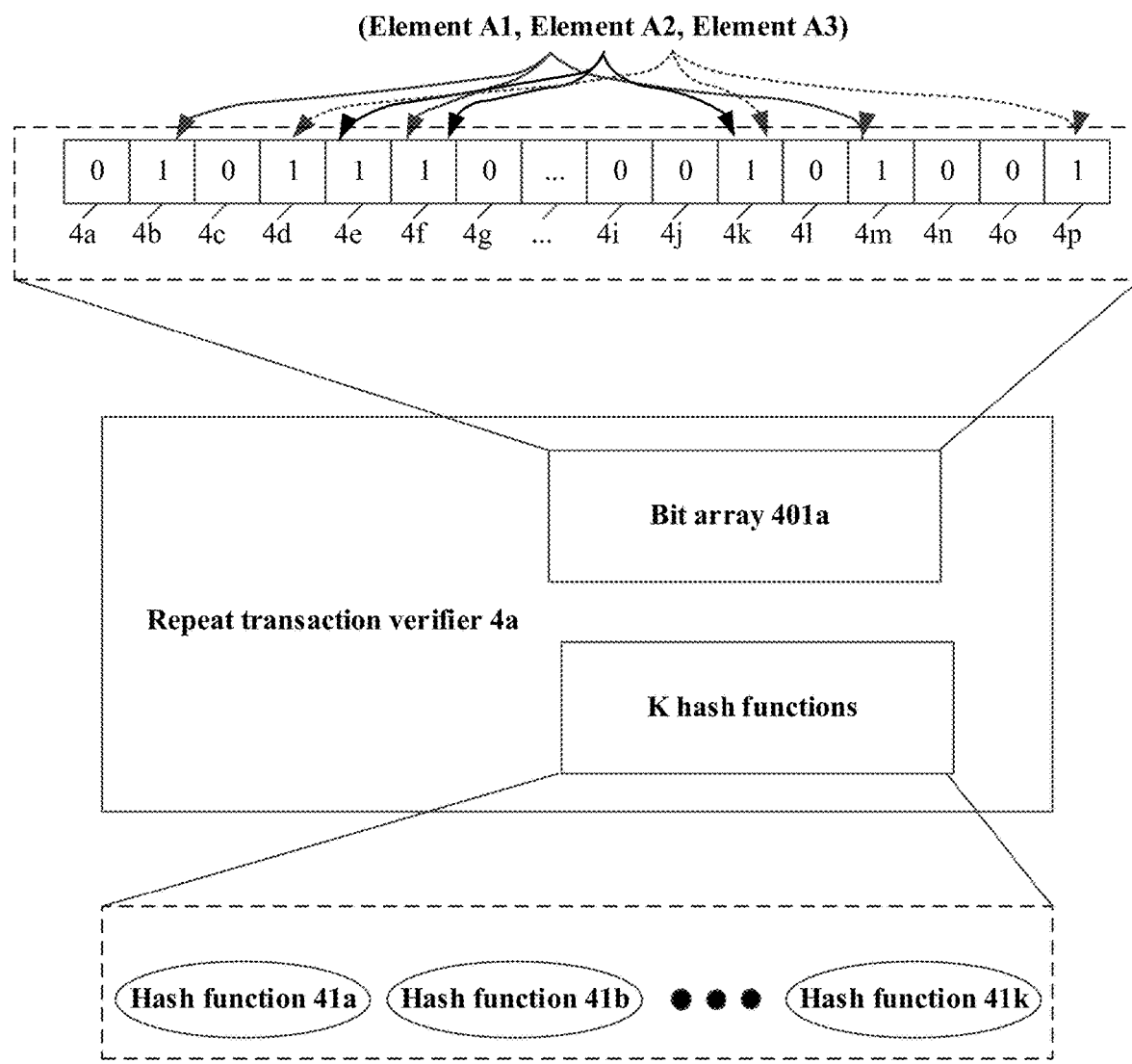
FIG. 4 is a schematic scenario diagram of determining a bit array to be queried provided by one embodiment.

In order to facilitate the comprehension, further, reference is made to FIG. 4. FIG. 4 is a schematic scenario diagram of determining a bit array to be queried provided by one embodiment. As shown in FIG. 4, while performing transaction query on a currently acquired transaction (i.e., the pending transaction) based on the first repeat transaction verification policy, the first node may trigger a repeat transaction verifier 4a shown in FIG. 4, so as to acquire a bit array 401a currently maintained by the repeat transaction verifier 4a. The bit array 401a shown in FIG. 4 includes M array elements, and the M array elements are composed of a very long binary vector, that is, each array element in the bit array 401a may be represented by a bit with the value of 1 or a bit with the value of 0. The array elements with the value of 0 are the first array elements and the array elements with the value of 1 are the second array elements. In one embodiment, the bit array (i.e. the bit array 401a shown in FIG. 4) composed of the first array elements and the second array elements may be taken as the bit array to be queried corresponding to the pending transaction.

While acquiring the bit array (i.e., the bit array 401a shown in FIG. 4) with the array length of M, the first node may also acquire K hash functions of the repeat transaction verifier. It is to be understood that the K hash functions herein may include a hash function 41a, a hash function 41b, . . . , and a hash function 41k shown in FIG. 4.

In one embodiment, through the introduction of multiple hash functions, the randomness of transaction mapping values obtained by hash mapping may be increased while hash location mapping (referred to as hash mapping for short) is performed on transaction hash values of a certain transaction, so that the transaction mapping values obtained by performing hash mapping on the transaction hash values of the transaction may be uniformly distributed in the bit array of the repeat transaction verifier as much as possible, thereby reducing the probability of hash collisions occurred between the transaction mapping values obtained by performing hash mapping on the transaction hash values of the transaction to a certain extent. In order to facilitate the comprehension, the situation that the hash functions of the repeat transaction verifier 4a are three hash functions is taken as an example, these three hash functions may be the hash function 41a, the hash function 41b and the hash function 41k shown in FIG. 4.

For example, with regard to an element A1, an element A2 and an element A3 shown in FIG. 4, the repeat transaction verifier does not directly store the 3 repetition verification elements in a repetition verification set it maintains. As shown in FIG. 4, in the bit array 401a with the array length of M, array elements on K key identification locations mapped by each repetition verification element in the repetition verification set are the second array elements, and with regard to the K key identification locations associated with one repetition verification element, one key identification location is an identification location obtained by performing hash location mapping on the repetition verification element through a hash function. Therefore, when the first node describes that the element A1 has been inserted at present by the bit array 401a in the repeat transaction verifier, transaction mapping values of the element A1 currently mapped to 3 target identification locations (for example, an identification location 4b, an identification location 4f and an identification location 4m) of the bit array 401a may be changed to 1. Similarly, when the first node describes that the element A2 has been inserted at present by the bit array 401a in the repeat transaction verifier, transaction mapping values of the element A2 currently mapped to 3 target identification locations (for example, an identification location 4e, the identification location 4f and an identification location 4k) of the bit array 401a may be changed to 1. By parity of reasoning, when the first node describes that the element A3 has been inserted at present by the bit array 401a in the repeat transaction verifier, transaction mapping values of the element A3 currently mapped to 3 target identification locations (for example, an identification location 4d, the identification location 4k and an identification location 4p) of the bit array 401a may be changed to 1.

As shown in FIG. 4, with regard to the element A1 and the element A2, there may be a case of sharing the second array elements (i.e. the array elements with the value of 1) on the same identification location (for example, the identification location 4f shown in FIG. 4), and with regard to the element A2 and the element A3, there may also be a case of sharing the second array elements (i.e. the array elements with the value of 1) on the same identification location (for example, the identification location 4k shown in FIG. 4).

When the first node performs repeat transaction verification on a currently acquired transaction by the repeat transaction verifier 4a shown in FIG. 4, whether the currently acquired transaction exists in the repetition verification set may be accurately determined. For example, when the values of the array elements on K (for example, 3) target identification locations associated with the currently acquired transaction have 0, it may be accurately and rapidly determined that the current transaction does not exist in the repetition verification set, that is, it may be determined that the currently acquired transaction is a non-repeat transaction.

However, as shown in FIG. 4, with regard to the 3 points of the identification location 4b, the identification location 4d and the identification location 4e shown in FIG. 4, although the array elements on the 3 key identification locations are all 1, it cannot be directly considered that the currently acquired transaction exists in the repetition verification set, that is, it cannot be directly considered that the currently acquired transaction is a repeat transaction. That is because that the 3 points of the identification location 4b, the identification location 4d and the identification location 4e shown in FIG. 4 are identification locations obtained by performing hash mapping according to hash values of 3 different elements. Accordingly, in one embodiment, second repeat transaction verification also needs to be further performed on the currently acquired transaction based on the second repeat transaction verification policy, so as to further verify whether the currently acquired transaction is a repeat transaction, thus improving the reliability of repeat transaction verification.

Step S103: Based on the K hash functions, map the pending transaction to K target identification locations of the bit array to be queried; among the M array elements, take array elements on the K target identification locations as transaction mapping values on the K target identification locations.

Figure 5:
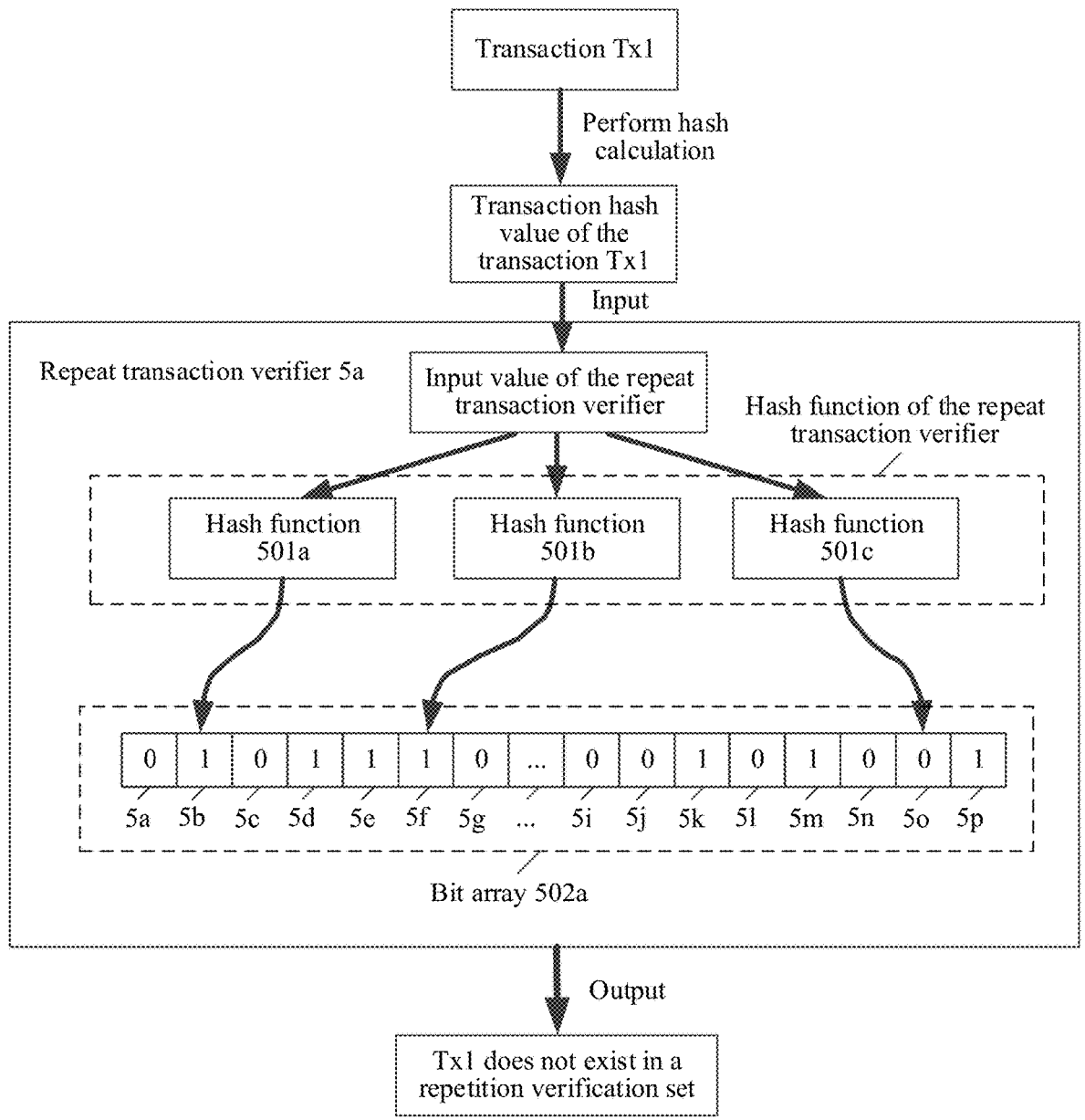
FIG. 5 is a schematic scenario diagram of mapping a pending transaction to a bit array to be queried by a hash function of a repeat transaction verifier provided by one embodiment.

In order to facilitate the comprehension, further, reference is made to FIG. 5. FIG. 5 is a schematic scenario diagram of mapping a pending transaction to a bit array to be queried by a hash function of a repeat transaction verifier provided by one embodiment. A bit array 502a shown in FIG. 5 may be the bit array to be queried in the embodiment corresponding to FIG. 4. That is, the bit array to be queried may be used for determining whether a transaction Tx1 shown in FIG. 5 exists in the repetition verification set of the repeat transaction verifier.

As shown in FIG. 5, when the currently acquired transaction is the transaction Tx1 shown in FIG. 5, the first node may perform hash calculation on the transaction Tx1 by a hash transformation rule followed by the first node and a user terminal (a blockchain client is run in the user terminal) transmitting the transaction adding request, so as to obtain a transaction hash value for uniquely identifying the transaction Tx1. Further, as shown in FIG. 5, the first node may input the transaction hash value of the transaction Tx1 into a repeat transaction verifier 5a shown in FIG. 5, that is, the transaction hash value of the transaction Tx1 is used as an input value of the repeat transaction verifier. Further, the first node may perform hash mapping on the input value again by K (i.e., K=3) hash functions shown in FIG. 5 to map the transaction Tx1 to 3 points on the bit array 502a, where one point corresponds to one bit.

These 3 points may be a transaction mapping value on an identification location 5b (i.e., a target identification location 1), a transaction mapping value on an identification location 5f (i.e., a target identification location 2), and a transaction mapping value on an identification location 5o (i.e., a target identification location 3), as shown in FIG. 5.

Further, the first node may further determine an association between first array elements (i.e., array elements with the value of 0) in the bit array to be queried and the transaction mapping values on the 3 target identification locations. That is, whether transaction mapping values identical to the first array elements exist may be searched in the transaction mapping values on the 3 target identification locations. If such transaction mapping values are found, it may be determined that the transaction Tx1 does not exist in a repetition verification set maintained by the repeat transaction verifier 5a. Otherwise, it may be temporarily considered that the transaction Tx1 might exist in the repetition verification set maintained by the repeat transaction verifier 5a, and second repeat transaction verification needs to be performed on a transaction pool, a transaction cache and a blockchain database based on the second repeat transaction verification policy, so as to finally determine whether the transaction Tx1 exists in the blockchain network.

Step S104: Determine an association between the first array elements and the transaction mapping values on the K target identification locations; and based on the association, obtain a first repeat transaction verification result of the first repeat transaction verification performed on the pending transaction.

In one embodiment, if the association between the first array elements and the transaction mapping values on the K target identification locations is a first association, it may be determined that transaction mapping values identical to the first array elements exist in the transaction mapping values on the K target identification locations, so that a repetition verification result that the pending transaction is a non-repeat transaction may be obtained based on the first association, and the determined repetition verification result that the pending transaction is the non-repeat transaction may be used as the first repeat transaction verification result of the first repeat transaction verification performed on the pending transaction.

As shown in FIG. 5, the transaction mapping value on the identification location 5b (i.e., the target identification location 1) and the transaction mapping value on the identification location 5f (i.e. the target identification location 2) are the second array elements, but the transaction mapping value on the identification location 5o (i.e. the target identification location 3) is the first array element. That is, the first node may determine that transaction mapping values identical to the first array elements exist in the K (i.e. K=3) transaction mapping values as the first association between the first array elements and the transaction mapping values on the K target identification locations, so that it may be determined that the transaction Tx1 does not exist in the repetition verification set maintained by the repeat transaction verifier 5a based on the first association, so as to control the repeat transaction verifier 5a to output a repeat transaction verification result that the Tx1 does not exist in the repetition verification set, and take the outputted repeat transaction verification result that the Tx1 does not exist in the repetition verification set as the first repeat transaction verification result of the first repeat transaction verification performed on the pending transaction.

It can be seen from one embodiment that when the pending transaction is acquired, whether the pending transaction exists in the repetition verification set maintained by the repeat transaction verifier may be determined in the node internal memory of the first node in advance by the repeat transaction verifier and a determined repeat transaction result may be used as the first repeat transaction verification result of the first repeat transaction verification performed on the pending transaction. It is to be understood that in one embodiment, a case that the current transaction is a non-repeat transaction may be rapidly determined by using the repeat transaction verifier to perform repeat transaction verification in the node internal memory. That is, in one embodiment, whether the pending transaction exists in the repetition verification set maintained by the repeat transaction verifier may be rapidly determined directly by the association between the first array elements in the repeat transaction verifier and the transaction mapping values on the K target identification locations, thereby improving the efficiency of repeat transaction verification without the need of accessing the blockchain database.

Figure 6:
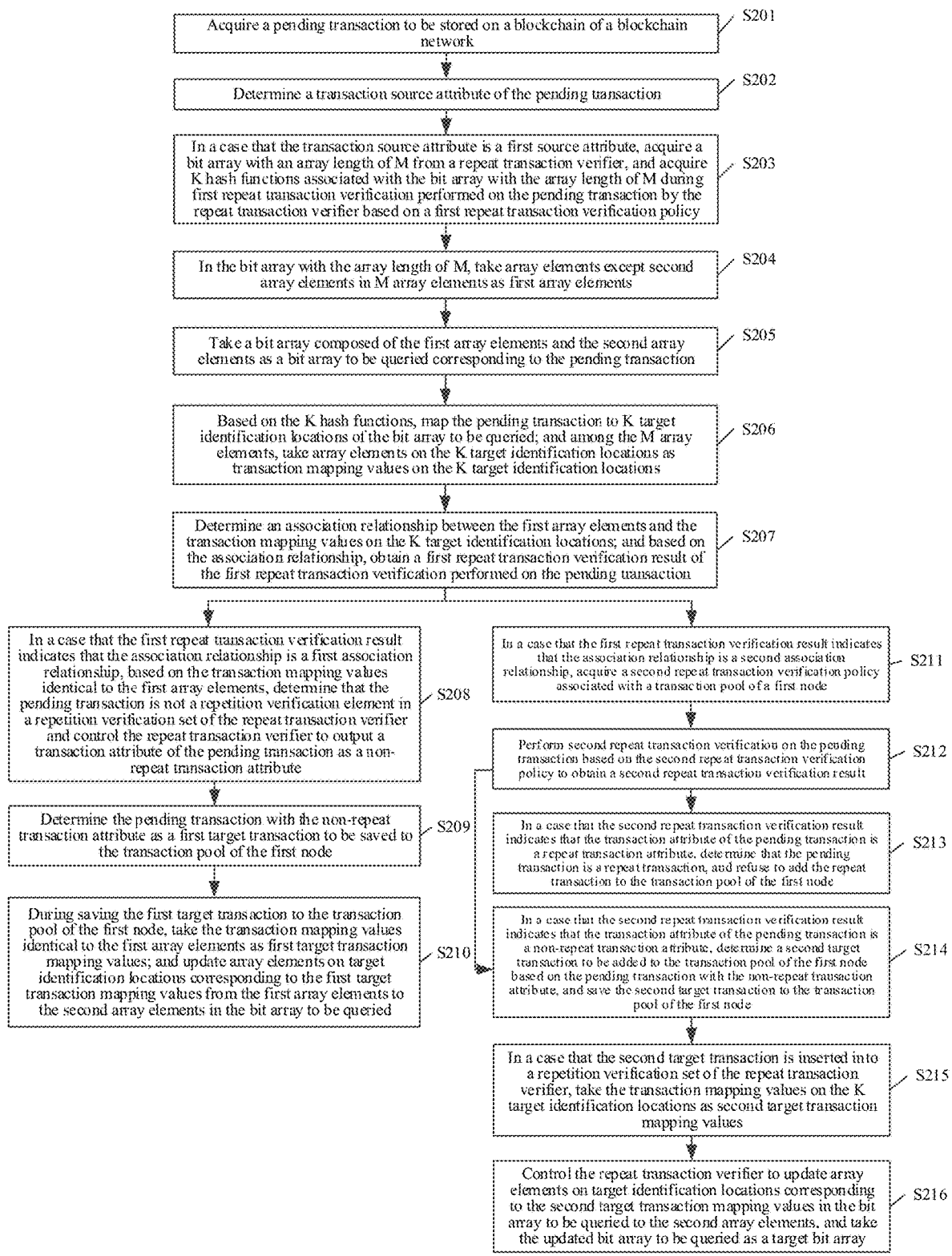
FIG. 6 is a schematic flowchart of a repeat transaction verification method provided by one embodiment.

Further, reference is made to FIG. 6. FIG. 6 is a schematic flowchart of a repeat transaction verification method provided by one embodiment. As shown in FIG. 6, the method may be performed by the first node in the blockchain network, and the first node may be any blockchain node (for example, the node 10c) in the consensus network 100a shown in FIG. 1. The method specifically includes the following steps S201 to S216:

Step S201: Acquire a pending transaction to be stored on a blockchain of a blockchain network.

Step S202: Determine a transaction source attribute of the pending transaction.

The transaction source attribute is used for indicating a repeat transaction verification policy used by the repeat transaction verifier (for example, the Bloom filter) during repeat transaction verification performed on the pending transaction.

If the transaction source attribute is a first source attribute, the repeat transaction verification policy includes a first repeat transaction verification policy and a second repeat transaction verification policy that are associated with a transaction pool of the first node. In order to facilitate the comprehension, the situation that the first source attribute is used for characterizing the pending transaction as a transaction in a transaction adding request is taken as an example herein, at this time, the transaction adding request may be transmitted by a blockchain client associated with the first node, and the first node may further perform the following step S203.

Step S203: When the transaction source attribute is the first source attribute, acquire a bit array with an array length of M from the repeat transaction verifier, and acquire K hash functions associated with the bit array with the array length of M during first repeat transaction verification performed on the pending transaction by the repeat transaction verifier based on the first repeat transaction verification policy. In the bit array with the array length of M, all array elements on K key identification locations, which are mapped by repetition verification elements in a repetition verification set of the repeat transaction verifier, are second array elements; and one key identification location is an identification location obtained by performing hash location mapping on the repetition verification elements by one hash function.

Step S204: In the bit array with the array length of M, take array elements except the second array elements in the M array elements as first array elements.

Identification locations corresponding to the first array elements are different from identification locations corresponding to the second array elements, and the sum of the quantity of elements of the first array elements and the quantity of elements of the second array elements is M.

Step S205: Take a bit array composed of the first array elements and the second array elements as a bit array to be queried corresponding to the pending transaction.

Step S206: Based on the K hash functions, map the pending transaction to K target identification locations of the bit array to be queried; among the M array elements, take array elements on the K target identification locations as transaction mapping values on the K target identification locations.

Step S207: Determine an association between the first array elements and the transaction mapping values on the K target identification locations; and based on the association, obtain a first repeat transaction verification result of the first repeat transaction verification performed on the pending transaction.

The association includes a first association, and the first association herein is used for characterizing that transaction mapping values identical to the first array elements exist in the transaction mapping values on the K target identification locations. At this time, the first node may perform the following step S208 to step S210. In some embodiments, the association may also include a second association, and the second association herein is used for characterizing that transaction mapping values identical to the first array elements do not exist in the transaction mapping values on the K target identification locations. At this time, the first node may further perform step S211 and step S212 after step S207 is finished.

Step S208: When the first repeat transaction verification result indicates that the association is the first association, determine that the pending transaction is not a repetition verification element in a repetition verification set of the repeat transaction verifier and control the repeat transaction verifier to output a transaction attribute of the pending transaction as a non-repeat transaction attribute.

Step S209: Determine the pending transaction with the non-repeat transaction attribute as a first target transaction to be saved to the transaction pool of the first node.

The first target transaction herein may be a non-repeat transaction determined by using the repeat transaction verifier to perform first repeat transaction verification on the pending transaction. At this time, the first node may perform the following step S210 to add the first target transaction into the transaction pool.

Step S210: During saving the first target transaction to the transaction pool of the first node, take the transaction mapping values identical to the first array elements on the K target identification locations as first target transaction mapping values; and update array elements on target identification locations corresponding to the first target transaction mapping values from the first array elements to second array elements in the bit array to be queried.

Figure 7:
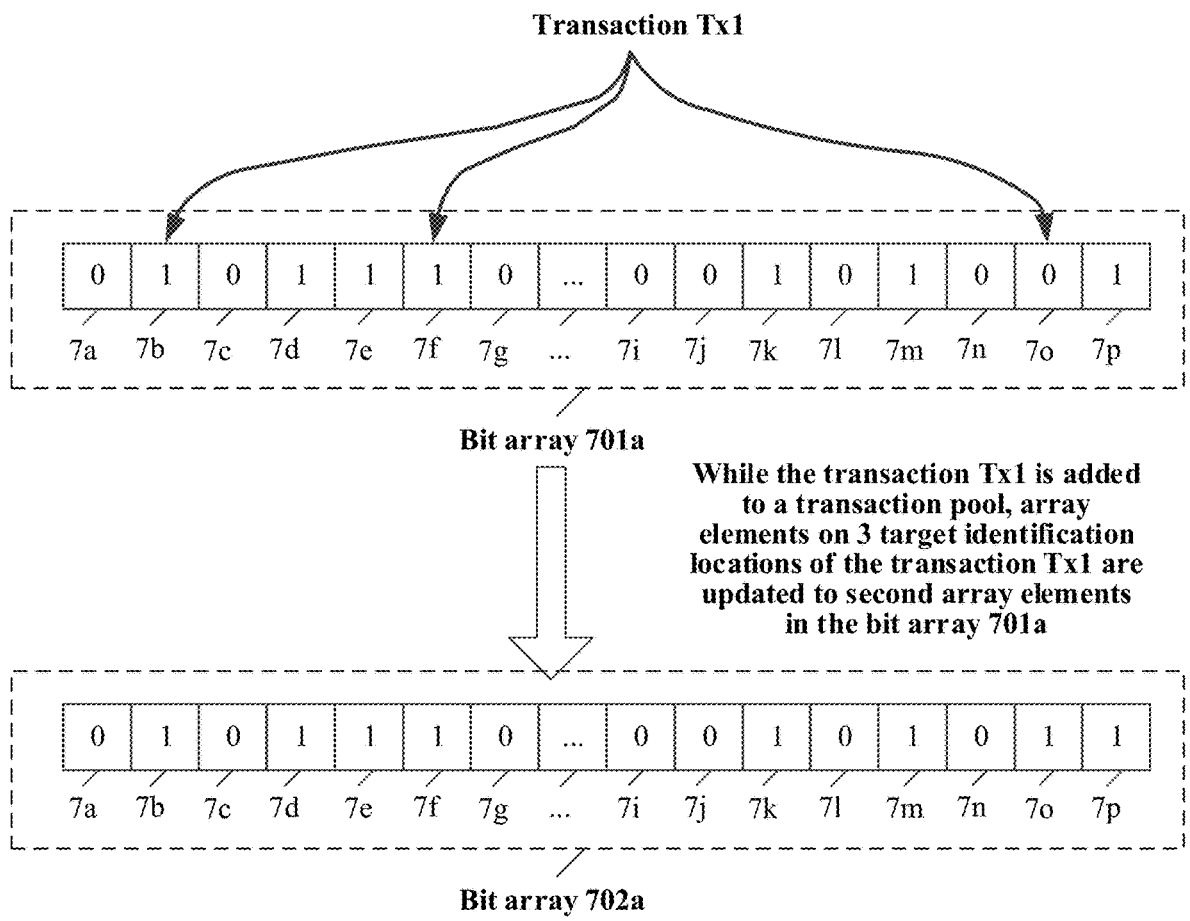
FIG. 7 is a schematic scenario diagram of updating a bit array to be queried provided by one embodiment.

In order to facilitate the comprehension, further, reference is made to FIG. 7. FIG. 7 is a schematic scenario diagram of updating a bit array to be queried provided by one embodiment. The transaction Tx1 shown in FIG. 7 may be the pending transaction in the embodiment corresponding to FIG. 5. As shown in FIG. 7, the first node may map the transaction Tx1 to 3 target identification locations of a bit array 701a shown in FIG. 7 by 3 hash functions of the repeat transaction verifier 5a shown in FIG. 5. The 3 target identification locations may be an identification location 7b, an identification location 7f and an identification location 7o shown in FIG. 7. As shown in FIG. 7, among transaction mapping values on the 3 target identification locations, the transaction mapping values on the identification location 7o are identical to the first array elements (i.e., array elements with the values of 0 are the same). As a result, the first node may determine that the transaction attribute of the transaction Tx1 shown in FIG. 7 is a non-repeat transaction attribute, and the transaction Tx1 with the non-repeat transaction attribute may be added to a transaction pool (for example, the transaction pool 200a in the embodiment corresponding to FIG. 2) as the first target transaction.

While the first target transaction is added to the transaction pool, array elements on the three target identification locations of the transaction Tx1 are directly set as second array elements to obtain a bit array 702a shown in FIG. 7, and the bit array 702a may be used as a target bit array, such that the target bit array may be used as a new bit array to be queried to perform step S205 to step S210 again while a new transaction (for example, a transaction Tx2) is acquired subsequently. As shown in FIG. 7, array elements on 3 target identification locations in the bit array 702a are all second array elements. At this time, the first node may insert the transaction Tx1 added to the transaction pool into the repetition verification set maintained by the repeat transaction verifier as a new repetition verification element. That is, the number of repetition verification elements in the repetition verification set may be progressively increased, for example, by adding one.

In some embodiments, in order to improve the efficiency of updating the array elements of the repeat transaction verifier, one embodiment may also directly take the transaction mapping values (i.e. the transaction mapping values on the identification location 7o of the bit array 701a shown in FIG. 7) identical to first array elements in the transaction mapping values on the K target identification locations as the first target transaction mapping values, and in the bit array to be queried, array elements on a target identification location (i.e., the identification location 7o) corresponding to the first target transaction mapping values are updated from the first array elements (i.e. the value 0 on the identification location 7o of the bit array 701a) to the second array elements (i.e. the value 1 on the identification location 7o of the bit array 702a).

Step S211: When the first repeat transaction verification result indicates that the association is the second association, acquire a second repeat transaction verification policy associated with the transaction pool of the first node.

Step S212: Perform second repeat transaction verification on the pending transaction based on the second repeat transaction verification policy to obtain a second repeat transaction verification result.

Specifically, the first node may search a first historical transaction matching with the pending transaction from the transaction pool of the first node based on the second repeat transaction verification policy. If the first historical transaction matching with the pending transaction is found from the transaction pool of the first node, it is determined that the transaction attribute of the pending transaction is a repeat transaction attribute; and the pending transaction with the repeat transaction attribute is taken as a first-class repeat transaction associated with the second repeat transaction verification policy, and the first-class repeat transaction may be taken as the second repeat transaction verification result obtained by performing the second repeat transaction verification on the pending transaction.

In some embodiments, if the first historical transaction matching with the pending transaction is not found from the transaction pool of the first node, it is determined that the transaction attribute of the pending transaction is a first non-repeat transaction attribute and the pending transaction with the first non-repeat transaction attribute may be taken as a first transitional repetition verification result associated with the second repeat transaction verification policy, and the first node may take the pending transaction with the first non-repeat transaction attribute as a first transitional transaction based on the first transitional repetition verification result, and search a second historical transaction matching with the first transitional transaction from a transaction cache of the first node. If the second historical transaction matching with the first transitional transaction is found from the transaction cache of the first node, it is determined that the transaction attribute of the first transitional transaction is a repeat transaction attribute and the first transitional transaction with the repeat transaction attribute is taken as a second-class repeat transaction associated with the second repeat transaction verification policy, and the first node may take the second-class repeat transaction as the second repeat transaction verification result obtained by performing the second repeat transaction verification on the pending transaction.

In some embodiments, if the second historical transaction matching with the first transitional transaction is not found from the transaction cache of the first node, it is determined that the transaction attribute of the first transitional transaction is a second non-repeat transaction attribute and the first transitional transaction with the second non-repeat transaction attribute may be taken as a second transitional repetition verification result associated with the second repeat transaction verification policy, and the first node may take the first transitional transaction with the second non-repeat transaction attribute as a second transitional transaction based on the second transitional repetition verification result, and search a third historical transaction matching with the second transitional transaction from a blockchain database associated with the first node. If the third historical transaction matching with the second transitional transaction is found from the blockchain database, it is determined that the transaction attribute of the second transitional transaction is a repeat transaction attribute and the second transitional transaction with the repeat transaction attribute is taken as a third-class repeat transaction associated with the second repeat transaction verification policy, and the first node may take the third-class repeat transaction as the second repeat transaction verification result obtained by performing the second repeat transaction verification on the pending transaction.

Step S213: When the second repeat transaction verification result indicates that the transaction attribute of the pending transaction is the repeat transaction attribute, determine that the pending transaction is a repeat transaction, and refuse to add the repeat transaction to the transaction pool of the first node.

Step S214: When the second repeat transaction verification result indicates that the transaction attribute of the pending transaction is the non-repeat transaction attribute, determine a second target transaction to be added to the transaction pool of the first node based on the pending transaction with the non-repeat transaction attribute, and save the second target transaction to the transaction pool of the first node.

Step S215: When the second target transaction is inserted into a repetition verification set of the repeat transaction verifier, take the transaction mapping values on the K target identification locations as second target transaction mapping values.

Step S216: Control the repeat transaction verifier to update array elements on target identification locations corresponding to the second target transaction mapping values in the bit array to be queried to second array elements, and take the updated bit array to be queried as a target bit array.

Figure 8:
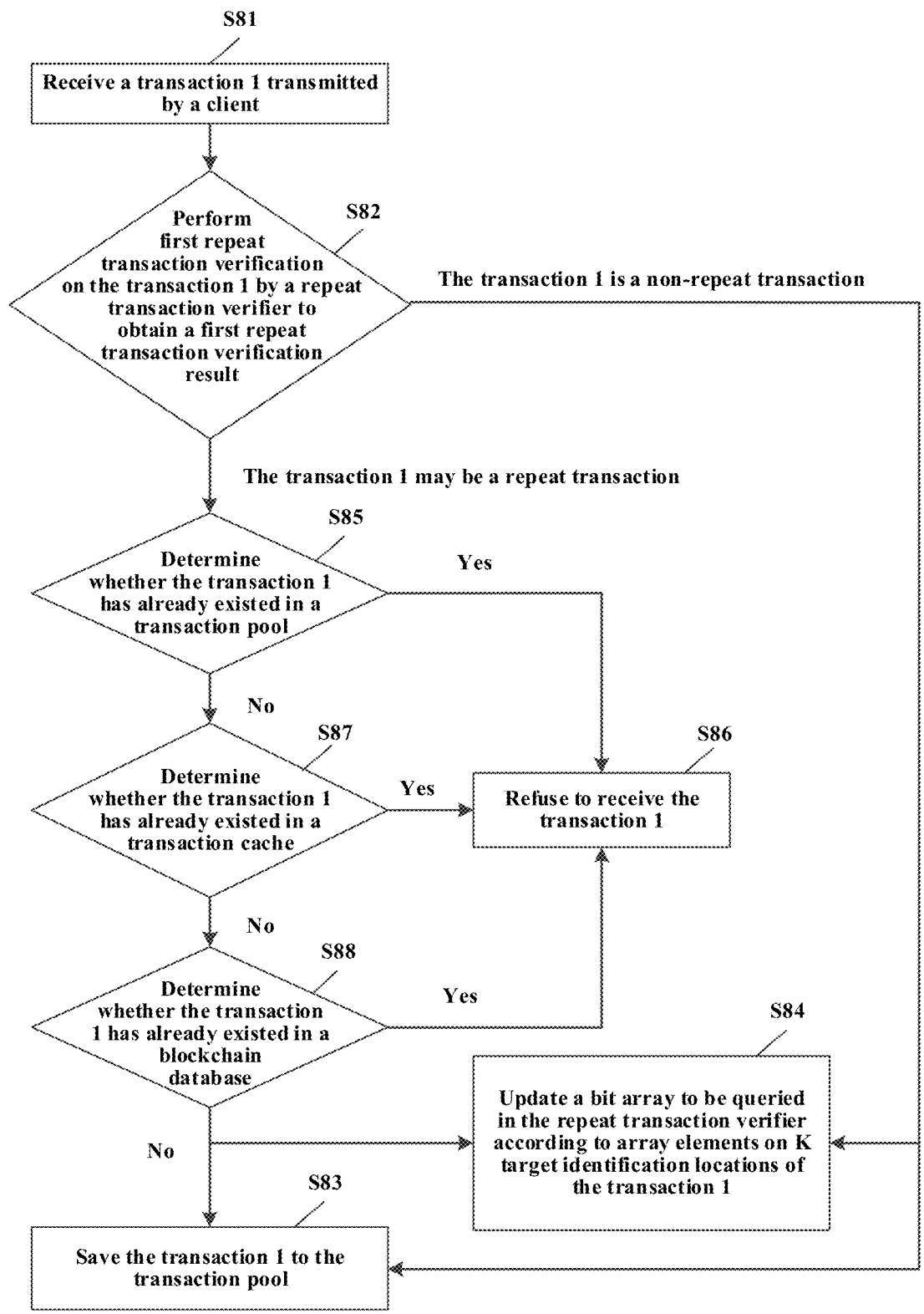
FIG. 8 is a sequence diagram of repeat transaction verification performed on a transaction in a business request provided by one embodiment.

In order to facilitate the comprehension, further, reference is made to FIG. 8. FIG. 8 is a sequence diagram of repeat transaction verification performed on a transaction in a business request provided by one embodiment. As shown in FIG. 8, the first node may receive a transaction 1 transmitted by a client (the client herein is the blockchain client) while performing step S81, and take the currently received transaction 1 as the pending transaction in step S201.

The transaction 1 (i.e., the pending transaction) herein may be a transaction in a business request transmitted by the client (i.e., the blockchain client). It can be understood that the business request herein may include a transaction adding request for requesting to receive the transaction 1 and transmitted by a user terminal on which the blockchain client is run. In some embodiments, the business request herein may also include a transaction synchronization request for requesting to synchronize the transaction 1 in its own transaction pool and transmitted by a second node in the blockchain network. For example, if the business request is the transaction adding request, the transaction 1 herein may be the transaction Tx1 in the embodiment corresponding to FIG. 7. In another example, if the business request is the transaction synchronization request, the transaction 1 herein may be the transaction Tx2 in the embodiment corresponding to FIG. 3.

Further, as shown in FIG. 8, while determining that the transaction source attribute of the transaction 1 is a first source attribute (that is, the transaction 1 is from the business request), the first node may further perform step S82 to perform first repeat transaction verification on the transaction 1 by a repeat transaction verifier to obtain a first repeat transaction verification result. For the method of acquiring the first repeat transaction verification result, reference may be made to specific description of step S203 to step S207 and details are not repeated herein.

Further, as shown in FIG. 8, if the first repeat transaction verification result indicates that the transaction 1 is a non-repeat transaction, step S83 may be performed to take the transaction 1 as a first target transaction, and the transaction 1 may be saved to the transaction pool. When the first node saves the transaction 1 to the transaction pool, step S84 may be further performed to rapidly update a bit array to be queried in the repeat transaction verifier according to array elements on K target identification locations of the transaction 1 obtained in step S82. For the specific implementation of updating the bit array to be queried by the first node, reference may be made to step S210 in the embodiment corresponding to FIG. 6.

In some embodiments, as shown in FIG. 8, if the first repeat transaction verification result obtained in step S82 indicates that the transaction 1 might be a repeat transaction, step S85 shown in FIG. 8 may be further performed by the second repeat transaction verification policy when the association is a second association, so as to determine whether the transaction 1 (i.e. the pending transaction) has already existed in the transaction pool. That is, at this time, the first node may search historical transactions matching with the transaction 1 from the transaction pool based on the second repeat transaction verification policy. In order to facilitate the comprehension, in one embodiment, the historical transactions in the transaction pool may be collectively referred to as first historical transactions.

Further, as shown in FIG. 8, if a first historical transaction matching with the transaction 1 is found from the transaction pool by the first node, a repeat transaction verification result (i.e. a repeat transaction verification result 1) that the transaction 1 has already existed in the transaction pool may be taken as a second repeat transaction verification result, and then step S86 may be performed, that is, directly refuse to receive the transaction 1. It is to be understood that while determining that the transaction 1 has already existed in the transaction pool, the first node may take the pending transaction with the repeat transaction attribute as a first-class repeat transaction associated with the second repeat transaction verification policy, and may take the first-class repeat transaction as the second repeat transaction verification result obtained by performing second repeat transaction verification on the transaction 1.

In some embodiments, as shown in FIG. 8, if the first historical transaction matching with the transaction 1 is not found from the transaction pool by the first node, a repeat transaction verification result (for example, a repetition verification result 1') that the transaction 1 does not exist in the transaction pool may be taken as a first transitional repetition verification result and step S87 may be performed to further determine whether the transaction 1 has already existed in a transaction cache. It is to be understood that while determining that the transaction 1 does not exist in the transaction pool, the first node may take the transaction 1 with the non-repeat transaction attribute (i.e. a first non-repeat transaction attribute) as the first transitional repetition verification result associated with the second repeat transaction verification policy, so as to further perform step S87 accordingly.

At this time, the first node may take the transaction 1 with the first non-repeat transaction attribute as a first transitional transaction, and further search whether a historical transaction matching with the first transitional transaction (i.e., the transaction 1 with the first non-repeat transaction attribute) exists in the transaction cache of step S87. In order to facilitate the comprehension, in one embodiment, the historical transactions stored in the transaction cache may be collectively referred to as second historical transactions. As shown in FIG. 8, if a second historical transaction matching with the first transitional transaction is found from the transaction cache by the first node, a repeat transaction verification result (i.e. a repeat transaction verification result 2) that the transaction 1 has already existed in the transaction cache may be taken as the second repeat transaction verification result obtained by performing the second repeat transaction verification on the transaction 1, and step S86 may be performed, that is, directly refuse to receive the transaction 1. It is to be understood that while determining that the transaction 1 has already existed in the transaction cache, the first node may take the first transitional transaction with the repeat transaction attribute as a second-class repeat transaction associated with the second repeat transaction verification policy, and may take the second-class repeat transaction as the second repeat transaction verification result obtained by performing the second repeat transaction verification on the transaction 1.

In some embodiments, as shown in FIG. 8, if the second historical transaction matching with the first transitional transaction (i.e. the transaction 1 with the first non-repeat transaction attribute) is not found from the transaction cache by the first node, a repeat transaction verification result (for example, a repetition verification result 2') that the transaction 1 does not exist in the transaction cache may be taken as a second transitional repetition verification result and step S88 may be performed to further determine whether the transaction 1 has already existed in a blockchain database. It is to be understood that while determining that the transaction 1 does not exist in the transaction cache, the first node may take the transaction 1 with the non-repeat transaction attribute (i.e. with the first non-repeat transaction attribute and a second non-repeat transaction attribute) as a second transitional repetition verification result associated with the second repeat transaction verification policy, so as to further perform step S88.

At this time, the first node may take the transaction 1 with the first non-repeat transaction attribute and the second non-repeat transaction attribute as a second transitional transaction, that is, the first node takes the transaction 1 which neither exists in the transaction pool nor exists in the transaction cache as the second transitional transaction, and the first node may further search whether a historical transaction matching with the second transitional transaction exists in the blockchain database of step S88. In order to facilitate the comprehension, in one embodiment, the historical transactions stored in the blockchain database may be collectively referred to as third historical transactions. As shown in FIG. 8, if a third historical transaction matching with the second transitional transaction is found from the blockchain database by the first node, a repeat transaction verification result (i.e. a repetition verification result 3) that the transaction 1 has already existed in the blockchain database may be taken as the second repeat transaction verification result obtained by performing the second repeat transaction verification on the transaction 1, and step S86 may be performed, that is, directly refuse to receive the transaction 1. It is to be understood that while determining that the transaction 1 has already existed in the blockchain database, the first node may take the second transitional transaction with the repeat transaction attribute as a third-class repeat transaction associated with the second repeat transaction verification policy, and may take the third-class repeat transaction as the second repeat transaction verification result obtained by performing the second repeat transaction verification on the transaction 1.

In some embodiments, as shown in FIG. 8, if a third historical transaction matching with the second transitional transaction (i.e. the transaction 1 with the first non-repeat transaction attribute and the second non-repeat transaction attribute) is not found from the blockchain database by the first node, a repeat transaction verification result (for example, a repetition verification result 3') that the transaction 1 does not exist in the blockchain database may be taken as the second repeat transaction verification result obtained by performing the second repeat transaction verification on the transaction 1, and step S83 and step S84 may be performed. It is to be understood that for the specific implementations of adding the transaction 1 to the transaction pool based on the second repeat transaction verification policy and updating the bit array to be queried by the first node, reference may be made to step S214 to step S216 in the embodiment corresponding to FIG. 6, and details are not repeated herein.

It can be seen from one embodiment that when the pending transaction is acquired, whether the pending transaction exists in the repetition verification set maintained by the repeat transaction verifier may be determined in the node internal memory of the first node in advance by the repeat transaction verifier and a determined repeat transaction result may be used as the first repeat transaction verification result of the first repeat transaction verification performed on the pending transaction. In one embodiment, repeat transaction verification is performed in the node internal memory by using the repeat transaction verifier. Accordingly, a case that the currently acquired transaction is a non-repeat transaction may be rapidly determined, that is, in one embodiment, whether the pending transaction exists in the repetition verification set maintained by the repeat transaction verifier may be rapidly determined directly by the association between the first array elements in the repeat transaction verifier and the transaction mapping values on the K target identification locations, thereby improving the efficiency of repeat transaction verification. In some embodiments, in one embodiment, when the currently acquired transaction (i.e. the pending transaction) is preliminarily determined by the repeat transaction verifier as a suspected repeat transaction, a repeat transaction verification policy for performing repeat transaction verification on the pending transaction may be switched to the second repeat transaction verification policy associated with the blockchain network from the first repeat transaction verification policy of the repeat transaction verifier, and the second repeat transaction verification may be performed on the pending transaction that is the suspected repeat transaction based on the second repeat transaction verification policy to obtain the second repeat transaction verification result. The second repeat transaction verification herein indicates that whether a historical transaction matching with the suspected repeat transaction exists is further searched in the transaction pool, the transaction cache and the blockchain database associated with the blockchain network. If the historical transaction matching with the suspected repeat transaction exists, it is determined that the suspected repeat transaction is surely a repeat transaction. Otherwise, if the historical transaction matching with the suspected repeat transaction does not exist, it may be determined that the suspected repeat transaction is a non-repeat transaction, and the reliability of repeat transaction verification may be improved.

Figure 9:
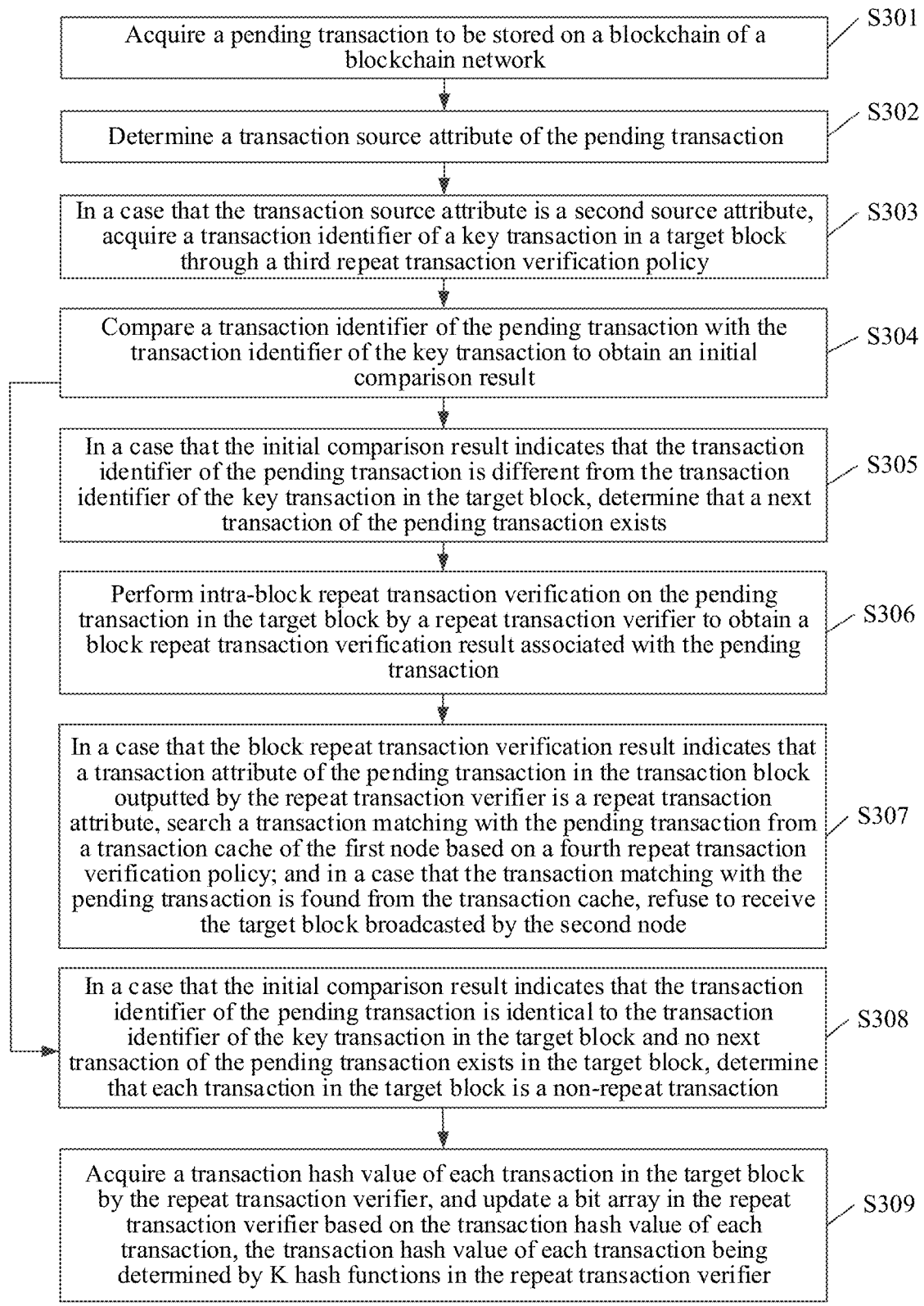
FIG. 9 is a schematic flowchart of a repeat transaction verification method provided by one embodiment.

Further, reference is made to FIG. 9. FIG. 9 is a schematic flowchart of a repeat transaction verification method provided by one embodiment. As shown in FIG. 9, the method may be performed by the first node in the blockchain network, and the first node may be any blockchain node (for example, the node 10c) in the consensus network 100a shown in FIG. 1. The method specifically includes the following step S301 to step S309:

Step S301: Acquire a pending transaction to be stored on a blockchain of a blockchain network.

Step S302: Determine a transaction source attribute of the pending transaction.

The transaction source attribute is used for indicating a repeat transaction verification policy used by a repeat transaction verifier during repeat transaction verification performed on the pending transaction. The transaction source attribute herein may include the first source attribute and the second source attribute.

If the transaction source attribute is the first source attribute, the repeat transaction verification policy may include a first repeat transaction verification policy and a second repeat transaction verification policy that are associated with a transaction pool of the first node. The priority of the first repeat transaction verification policy is higher than the priority of the second repeat transaction verification policy. The first source attribute may be used for characterizing that the pending transaction is a transaction in a transaction adding request, and the transaction adding request is transmitted by a blockchain client associated with the first node. In some embodiments, the first source attribute herein may also be used for characterizing that the pending transaction is a transaction in a transaction synchronization request. The transaction in the transaction adding request and the transaction in the transaction synchronization request may be collectively referred to as transactions in a business request. For the specific process of performing repeat transaction verification on received transactions in the business request by the first node, reference may be made to the description for the specific process of performing repeat transaction verification on the transaction 1 in the embodiment corresponding to FIG. 8, and details are not repeated herein.

If the transaction source attribute is the second source attribute, the repeat transaction verification policy may include a third repeat transaction verification policy and a fourth repeat transaction verification policy that are associated with a transaction cache of the first node. The priority of the third repeat transaction verification policy is higher than the priority of the fourth repeat transaction verification policy. For example, the first node may perform the following step S303 in advance based on the third repeat transaction verification policy. The second source attribute is used for characterizing the pending transaction as a transaction in a target block broadcasted by a second node in the blockchain network. Each transaction in the target block corresponds to a transaction identifier, and the transaction identifier is used for characterizing a packaging order of the transaction in the target block.

In order to facilitate the comprehension, the situation that the transaction source attribute is the second source attribute is taken as an example to elaborate the specific process of performing repeat transaction verification on received transactions in the target block by the first node, where the transactions are transmitted by the second node.

Step S303: When the transaction source attribute is the second source attribute, acquire a transaction identifier of a key transaction in the target block based on the third repeat transaction verification policy.

The key transaction is a transaction with a maximum packaging order in N transactions included in the target block, and N is a positive integer.

Step S304: Compare a transaction identifier of the pending transaction with the transaction identifier of the key transaction to obtain an initial comparison result.

Step S305: When the initial comparison result indicates that the transaction identifier of the pending transaction is different from the transaction identifier of the key transaction in the target block, determine that a next transaction of the pending transaction exists.

Step S306: Perform intra-block repeat transaction verification on the pending transaction in the target block by the repeat transaction verifier to obtain a block repeat transaction verification result associated with the pending transaction.

Specifically, the first node may acquire a bit array and K hash functions of the repeat transaction verifier during first repeat transaction verification performed on the pending transaction by the repeat transaction verifier based on the third repeat transaction verification policy and take the acquired bit array as a bit array to be queried corresponding to the pending transaction. M array elements of the bit array to be queried include first array elements; K is a positive integer less than M; and M is the array length of the bit array to be queried.

Further, based on the K hash functions, the first node may map the pending transaction to K target identification locations of the bit array to be queried; among the M array elements, take array elements on the K target identification locations as transaction mapping values on the K target identification locations. Further, the first node may determine an association between the first array elements and the transaction mapping values on the K target identification locations; and based on the association, obtain a first repeat transaction verification result of the first repeat transaction verification performed on the pending transaction, and the first repeat transaction verification result may be taken as a block repeat transaction verification result associated with the pending transaction.

Step S307: When the block repeat transaction verification result indicates that a transaction attribute of the pending transaction in the target block is a repeat transaction attribute, search a transaction matching with the pending transaction from the transaction cache of the first node based on the fourth repeat transaction verification policy; and when the transaction matching with the pending transaction is found from the transaction cache, refuse to receive the target block broadcasted by the second node.

In some embodiments, if the block repeat transaction verification result indicates that the pending transaction in the target block is a non-repeat transaction, a next transaction of the pending transaction may be continually determined as a new pending transaction, so as to repeat step S304 to step S307 until the first node performs repeat transaction verification on a transaction (i.e. the key transaction) with the maximum packaging order in the target block and the verification passes. At this time, it may be determined that each transaction in the target block is a non-repeat transaction.

Step S308: When the initial comparison result indicates that the transaction identifier of the pending transaction is identical to the transaction identifier of the key transaction in the target block and no next transaction of the pending transaction exists in the target block, determine that each transaction in the target block is a non-repeat transaction.

It can be seen that the first node may compare a transaction identifier of the newly acquired pending transaction with the transaction identifier of the key transaction in the target block to obtain the latest initial comparison result, when the latest initial comparison result indicates that the transaction identifier of the newly acquired pending transaction is identical to the transaction identifier of the key transaction in the target block and no next transaction of the pending transaction exists in the target block, the first node may determine that each transaction in the target block is a non-repeat transaction, and the following step S309 may be performed.

> Step S309: Acquire a transaction hash value of each transaction in the target block by the repeat transaction verifier, and update the bit array in the repeat transaction verifier based on the transaction hash value of each transaction, the transaction hash value of each transaction being determined by the K hash functions in the repeat transaction verifier.

Figure 10:
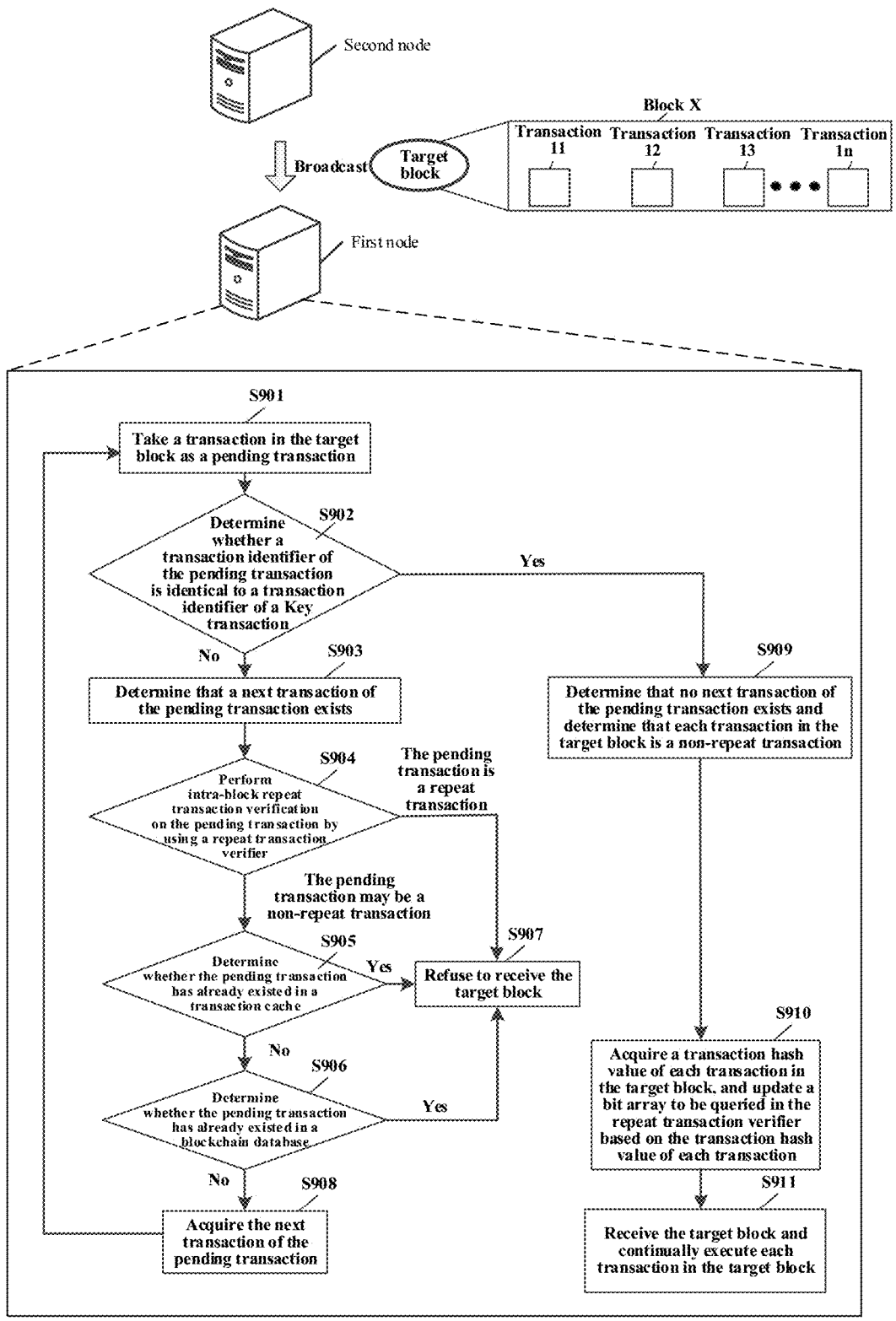
FIG. 10 is a scenario embodiment of performing repeat transaction verification on a transaction in a block provided by one embodiment.

In order to facilitate the comprehension, further, reference is made to FIG. 10. FIG. 10 is a scenario embodiment of performing repeat transaction verification on a transaction in a block provided by one embodiment. A first node shown in FIG. 10 may receive a target block broadcasted by a second node. The target block may be a block X shown in FIG. 10. The block X may include N transactions, and the N transactions herein may specifically include a transaction 11, a transaction 12, a transaction 13, . . . , and a transaction 1n shown in FIG. 10. Each transaction in the target block corresponds to a transaction identifier, and the transaction identifier is used for characterizing a packaging order of the transaction in the target block. N herein is a positive integer.

As shown in FIG. 10, after acquiring the target block, the first node may perform step S901 to transversely take the transactions in the target block as a pending transaction according to the transaction packaging order of each transaction in the target block. In order to facilitate the comprehension, in one embodiment, the transaction 11 (with the minimum packaging order) shown in FIG. 10 is taken as the pending transaction. The pending transaction is from the block X broadcasted by the second node, so that the first node may determine that the transaction source attribute of the transaction 11 is the second source attribute, and the first node may acquire a transaction identifier of a key transaction (i.e. a transaction with the maximum packaging order, for example, the transaction 1n shown in FIG. 10) in the target block based on the third repeat transaction verification policy (i.e. a repeat transaction verification policy used during repeat transaction verification performed on the transaction 11 by the repeat transaction verifier), and step S902 shown in FIG. 10 may be performed to determine whether a transaction identifier of the pending transaction (for example, the transaction 11) is identical to the transaction identifier of the key transaction (for example, the transaction 1n). In other words, at this time, the first node may compare the transaction identifier of the pending transaction with the transaction identifier of the key transaction to obtain an initial comparison result.

Further, as shown in FIG. 10, if the initial comparison result indicates that the transaction identifier of the pending transaction (for example, the transaction 11) is different from the transaction identifier of the key transaction (for example, the transaction 1n) in the target block, it is determined that there is a next transaction of the pending transaction, and step S904 shown in FIG. 10 may be performed to perform intra-block repeat transaction verification on the pending transaction (for example, the transaction 11) by the repeat transaction verifier (the repeat transaction verifier herein may be the Bloom filter) to obtain a block repeat transaction verification result. For the specific implementation of performing repeat transaction verification on the pending transaction 11 by the first node through the repeat transaction verifier (for example, the Bloom filter), reference may be made to the description for the specific process of performing repeat transaction verification on the pending transaction based on the first repeat transaction verification policy in the embodiment corresponding to FIG. 3, and details are not repeated herein.

As shown in FIG. 10, if the block repeat transaction verification result indicates that the pending transaction (for example, the transaction 11) is a repeat transaction, the first node may perform step S907 shown in FIG. 10 to refuse to receive the target block. Otherwise, if the block repeat transaction verification result indicates that the pending transaction (for example, the transaction 11) might be a non-repeat transaction, the first node may further perform step S905 shown in FIG. 10 based on the fourth repeat transaction verification policy associated with the second source attribute, so as to determine whether the pending transaction (for example, the transaction 11) has already existed in the transaction cache. In one embodiment, the first node may search whether there is a transaction hash value of a fourth historical transaction matching with a transaction hash value of the pending transaction (for example, the transaction 11) in the transaction cache. The fourth historical transaction herein may be a historical transaction in historical blocks to be stored on a blockchain acquired by the first node before the target block is received. These historical blocks may be temporarily stored in the transaction cache, such that these historical blocks are subsequently written into a target blockchain corresponding to a blockchain database shown in FIG. 10 after it is determined that these historical blocks belong to the longest chain.

Further, as shown in FIG. 10, if the transaction hash value of the fourth historical transaction matching with the transaction hash value of the pending transaction (for example, the transaction 11) is found in the transaction cache by the first node, it is determined that the pending transaction (for example, the transaction 11) has already existed in the transaction cache shown in FIG. 10, and step S907 shown in FIG. 10 may be performed to refuse to receive the target block. Otherwise, if the transaction hash value of the fourth historical transaction matching with the transaction hash value of the pending transaction (for example, the transaction 11) is not found in the transaction cache by the first node, step S906 shown in FIG. 10 is performed based on the fourth repeat transaction verification policy to determine whether the pending transaction (for example, the transaction 11) has already existed in the blockchain database. In one embodiment, the first node may search whether there is a transaction hash value of a fifth historical transaction matching with the transaction hash value of the pending transaction (for example, the transaction 11) in the blockchain database. The fifth historical transaction herein may be a historical transaction in historical blocks have been stored on a blockchain.

Further, as shown in FIG. 10, if the transaction hash value of the fifth historical transaction matching with the transaction hash value of the pending transaction (for example, the transaction 11) is found in the blockchain database by the first node, it is determined that the pending transaction (for example, the transaction 11) has already existed in the blockchain database, and step S907 shown in FIG. 10 may be performed to refuse to receive the target block. Otherwise, if the transaction hash value of the fifth historical transaction matching with the transaction hash value of the pending transaction (for example, the transaction 11) is not found in the blockchain database by the first node, it is determined that the pending transaction (for example, the transaction 11) does not exist in the blockchain database, and step S908 shown in FIG. 10 may be performed to acquire a next transaction (for example, the transaction 12 shown in FIG. 10) of the pending transaction from the target block (for example, the block X shown in FIG. 10), so as to repeat step S901 to step S908 shown in FIG. 10 until the first node acquires the transaction $1n$ with the maximum packaging order in the target block, and step S909 shown in FIG. 10 may be performed while repeat transaction verification is performed on the transaction $1n$ by step S901 to step S908 and the verification passes, so as to determine that each transaction in the target block is a non-repeat transaction.

Further, the first node may acquire a transaction hash value of each transaction in the target block by the repeat transaction verifier while performing step S910, and step S911 shown in FIG. 10 may be performed, that is, the first node may update a bit array in the repeat transaction verifier based on the transaction hash value of each transaction.

At this time, the first node may determine that the target block has already existed in the transaction cache of the first node when it is determined that the pending transaction (for example, the transaction 11) has already existed in the transaction cache by the first node. For example, in a case of downtime of the first node or network delay (that is, the first node does not feed a block receiving message back to the second node within response duration), the second node will repeatedly transmit a target block. When receiving the target block (for example, the block X shown in FIG. 10) repeatedly transmitted by the second node, the first node may perform repetition verification on the target block by using the method above, and refuse to receive the target block that has already existed, thereby preventing a storage space of the node internal memory from wasting.

It can be seen from one embodiment that repeat transaction verification is performed in the node internal memory by using the repeat transaction verifier to rapidly determine whether the transaction in the currently acquired target block is a repeat transaction, and when all the transactions in the target block are non-repeat transactions, the target block may be received, so that each transaction in the target block may be subsequently performed, and then a transaction execution result of each transaction in the target block is temporarily stored in the transaction cache of the first node. That is, in one embodiment, whether the pending transaction exists in the repeat transaction verifier deployed in the node internal memory of the first node may be rapidly determined directly by the association between the first array elements in the repeat transaction verifier and the transaction mapping values on the K target identification locations, thereby improving the efficiency of repeat transaction verification. In some embodiments, in one embodiment, when the currently acquired transaction (i.e. the pending transaction) is preliminarily determined by the repeat transaction verifier as a suspected repeat transaction, a repeat transaction verification policy for performing repeat transaction verification on the pending transaction may be switched to the fourth repeat transaction verification policy associated with the blockchain network from the third repeat transaction verification policy of the repeat transaction verifier, and the second repeat transaction verification may be performed on the pending transaction that is the suspected repeat transaction based on the fourth repeat transaction verification policy to obtain the second repeat transaction verification result. It is to be understood that the second repeat transaction verification herein indicates whether a historical transaction matching with the suspected repeat transaction exists is searched in the transaction cache and the blockchain database associated with the blockchain network. If the historical transaction matching with the suspected repeat transaction exists, it is determined that the suspected repeat transaction is surely a repeat transaction, and the target block may be refused to be received, thereby reducing the storage overhead of the node internal memory. Otherwise, if the historical transaction matching with the suspected repeat transaction does not exist, it may be determined that the suspected repeat transaction is a non-repeat transaction, and the reliability of repeat transaction verification may be improved.

Figure 11:
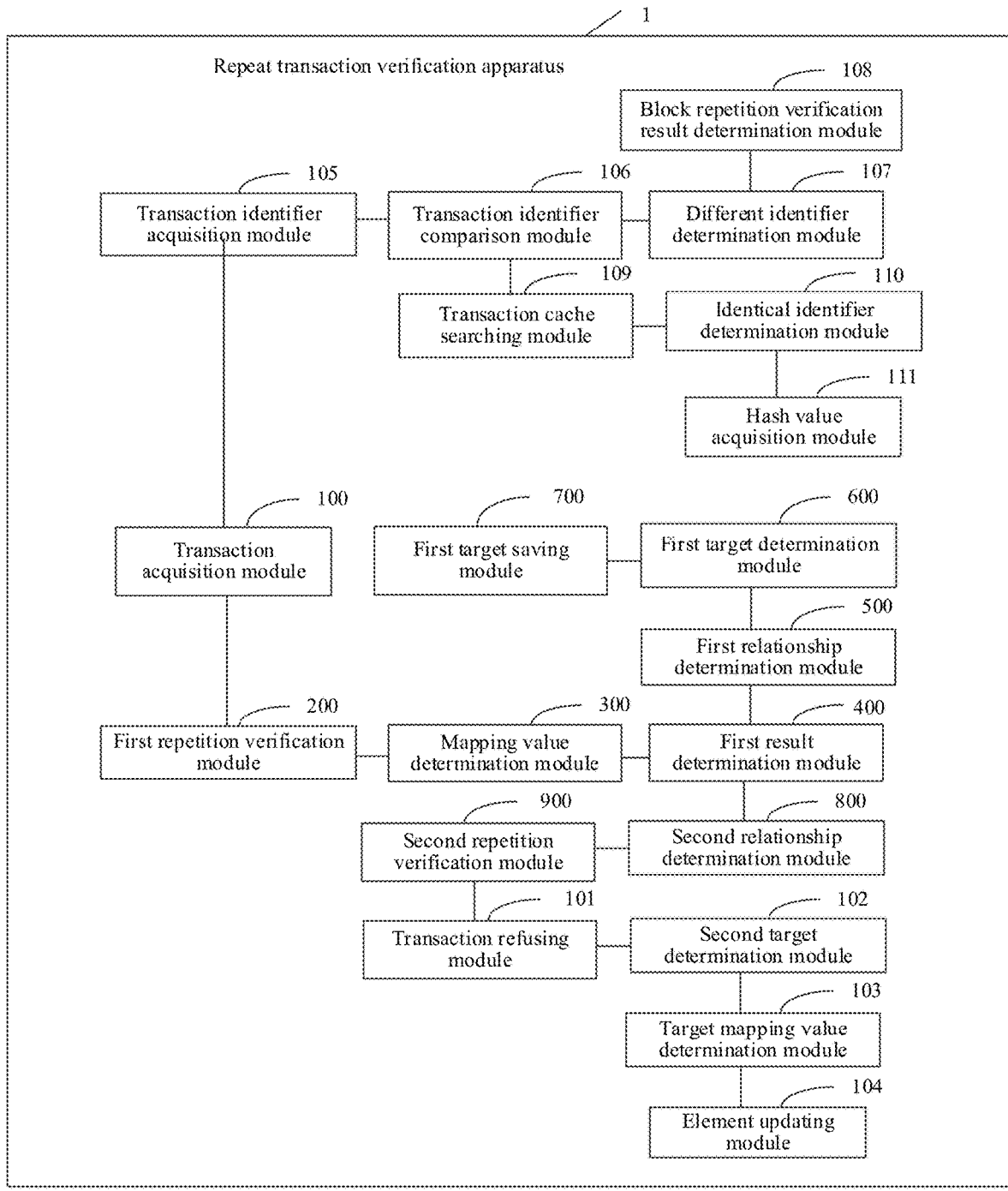
FIG. 11 is a schematic structural diagram of a repeat transaction verification apparatus provided by this application.

Further, FIG. 11 is a schematic structural diagram of a repeat transaction verification apparatus according to this application. The repeat transaction verification apparatus 1 may be a computer program (including a program code) run on a computer device. For example, the repeat transaction verification apparatus 1 is application software, and the repeat transaction verification apparatus 1 may be configured to perform the corresponding steps in the method provided in one embodiment. As shown in FIG. 11, the repeat transaction verification apparatus 1 may be applied to the first node. The first node may be any blockchain node in the consensus network. For example, the repeat transaction verification apparatus 1 may be applied to the node 10c in the embodiment corresponding to FIG. 1. As shown in FIG. 11, the repeat transaction verification apparatus 1 may include: a transaction acquisition module 100, a first repetition verification module 200, a mapping value determination module 300 and a first result determination module 400. Further, the repeat transaction verification apparatus 1 may also include: a first relationship determination module 500, a first target determination module 600, a first target saving module 700, a second relationship determination module 800, a second repetition verification module 900, a transaction refusing module 101, a second target determination module 102, a target mapping value determination module 103, an element updating module 104, a transaction identifier acquisition module 105, a transaction identifier comparison module 106, a different identifier determination module 107, a block repetition verification result determination module 108, a transaction cache searching module 109, an identical identifier determination module 110 and a hash value acquisition module 111.

The transaction acquisition module 100 is configured to acquire a pending transaction to be stored on a blockchain of a blockchain network.

In some embodiments, when acquiring the pending transaction to be stored on the blockchain of the blockchain network by the transaction acquisition module 100, the transaction acquisition module 100 is also configured to determine a transaction source attribute of the pending transaction, and the transaction source attribute is used for indicating a repeat transaction verification policy used by a repeat transaction verifier during repeat transaction verification performed on the pending transaction.

The first repetition verification module 200 is configured to acquire a bit array and K hash functions of the repeat transaction verifier during first repeat transaction verification performed on the pending transaction by the repeat transaction verifier and take the acquired bit array as a bit array to be queried corresponding to the pending transaction; the bit array to be queried includes M array elements, the M array elements includes first array elements, M is an integer greater than 1 and K is a positive integer less than the M.

When the transaction source attribute is a first source attribute, the repeat transaction verification policy includes a first repeat transaction verification policy associated with a transaction pool of the first node; the first source attribute is used for characterizing the pending transaction as a transaction in a transaction adding request; and the transaction adding request is transmitted by a blockchain client associated with the first node.

The first repetition verification module 200 includes: a first repeat transaction verification unit 2001, a first element determination unit 2002 and a query array determination unit 2003.

The first repeat transaction verification unit 2001 is configured to, during the first repeat transaction verification performed on the pending transaction by the repeat transaction verifier based on the first repeat transaction verification policy, acquire a bit array with an array length of M from the repeat transaction verifier, and acquire K hash functions associated with the bit array with the array length of M; in the bit array with the array length of M, all array elements on K key identification locations, which are mapped by repetition verification elements in a repetition verification set of the repeat transaction verifier, are second array elements; one key identification location is an identification location obtained by performing hash location mapping on the repetition verification elements by one hash function.

The first element determination unit 2002 is configured to, in the bit array with the array length of M, take array elements except the second array elements in the M array elements as the first array elements; identification locations corresponding to the first array elements are different from identification locations corresponding to the second array elements, and the sum of the quantity of elements of the first array elements and the quantity of elements of the second array elements is M.

The query array determination unit 2003 is configured to take a bit array composed of the first array elements and the second array elements as the bit array to be queried corresponding to the pending transaction.

For the specific implementation of the first repeat transaction verification unit 2001, the first element determination unit 2002 and the query array determination unit 2003, reference may be made to the description about step S102 in the embodiment corresponding to FIG. 3, and details are not described herein again.

The mapping value determination module 300 is configured to, based on the K hash functions, map the pending transaction to K target identification locations of the bit array to be queried; among the M array elements, take array elements on the K target identification locations as transaction mapping values on the K target identification locations.

The first result determination module 400 is configured to determine an association between the first array elements and the transaction mapping values on the K target identification locations; and based on the association, obtain a first repeat transaction verification result of the first repeat transaction verification performed on the pending transaction.

In some embodiments, the association includes a first association, and the first association is used for characterizing that transaction mapping values identical to the first array elements exist in the transaction mapping values on the K target identification locations.

The first relationship determination module 500 is configured to, when the first repeat transaction verification result indicates that the association is the first association, determine that the pending transaction is not a repetition verification element in the repetition verification set of the repeat transaction verifier and control the repeat transaction verifier to output a transaction attribute of the pending transaction as a non-repeat transaction attribute.

The first target determination module 600 is configured to determine the pending transaction with the non-repeat transaction attribute as a first target transaction to be saved to the transaction pool of the first node.

In some embodiments, the first target saving module 700 is configured to, during saving the first target transaction to the transaction pool of the first node, take the transaction mapping values identical to the first array elements on the K target identification locations as first target transaction mapping values; and update array elements on target identification locations corresponding to the first target transaction mapping values from the first array elements to second array elements in the bit array to be queried.

In some embodiments, the association includes a second association, and the second association is used for characterizing that transaction mapping values identical to the first array elements do not exist in the transaction mapping values on the K target identification locations.

The second relationship determination module 800 is configured to, when the first repeat transaction verification result indicates that the association is the second association, acquire a second repeat transaction verification policy associated with the transaction pool of the first node.

The second repetition verification module 900 is configured to perform second repeat transaction verification on the pending transaction based on the second repeat transaction verification policy to obtain a second repeat transaction verification result.

The second repetition verification module 900 includes a transaction pool searching unit 901, a first repetition determination unit 902 and a second result determination unit 903. In some embodiments, the second repetition verification module 900 further includes:

the transaction pool searching unit 901, configured to, based on the second repeat transaction verification policy, search a first historical transaction matching with the pending transaction from the transaction pool of the first node;

the first repetition determination unit 902, configured to, when the first historical transaction matching with the pending transaction is found from the transaction pool of the first node, determine that the transaction attribute of the pending transaction is a repeat transaction attribute and take the pending transaction with the repeat transaction attribute as a first-class repeat transaction associated with the second repeat transaction verification policy; and the second result determination unit 903, configured to take the first-class repeat transaction as the second repeat transaction verification result obtained by performing the second repeat transaction verification on the pending transaction.

In some embodiments, a first transitional result determination unit 904 is configured to, when the first historical transaction matching with the pending transaction is not found from the transaction pool of the first node, determine that the transaction attribute of the pending transaction is a first non-repeat transaction attribute, and take the pending transaction with the first non-repeat transaction attribute as a first transitional repetition verification result associated with the second repeat transaction verification policy.

A transaction cache searching unit 905 is configured to, based on the first transitional repetition verification result, take the pending transaction with the first non-repeat transaction attribute as a first transitional transaction and search a second historical transaction matching with the first transitional transaction from a transaction cache of the first node.

A second repetition determination unit 906 is configured to, when the second historical transaction matching with the first transitional transaction is found from the transaction cache of the first node, determine that the transaction attribute of the first transitional transaction is a repeat transaction attribute, and take the first transitional transaction with the repeat transaction attribute as a second-class repeat transaction associated with the second repeat transaction verification policy.

A second result determination unit 907 is configured to take the second-class repeat transaction as the second repeat transaction verification result obtained by performing the second repeat transaction verification on the pending transaction.

In some embodiments, a second transitional result determination unit 908 is configured to, when the second historical transaction matching with the first transitional transaction is not found from the transaction cache of the first node, determine that the transaction attribute of the first transitional transaction is a second non-repeat transaction attribute, and take the first transitional transaction with the second non-repeat transaction attribute as a second transitional repetition verification result associated with the second repeat transaction verification policy.

A database searching unit 909 is configured to, based on the second transitional repetition verification result, take the first transitional transaction with the second non-repeat transaction attribute as a second transitional transaction and search a third historical transaction matching with the second transitional transaction from a blockchain database associated with first node.

A third repetition determination unit 910 is configured to, when the third historical transaction matching with the second transitional transaction is found from the blockchain database, determine that a transaction attribute of the second transitional transaction is a repeat transaction attribute, and take the second transitional transaction with the repeat transaction attribute as a third-class repeat transaction associated with the second repeat transaction verification policy.

The second result determination unit 903 is also configured to take the third-class repeat transaction as the second repeat transaction verification result obtained by performing the second repeat transaction verification on the pending transaction.

For the specific implementations of the transaction pool searching unit 901, the first repetition determination unit 902, the second result determination unit 903, the first transitional result determination unit 904, the transaction cache searching unit 905, the second repetition determination unit 906, the second result determination unit 907, the second transitional result determination unit 908, the database searching unit 909 and the third repetition determination unit 910, reference may be made to the description about the second repeat transaction verification policy in the embodiment corresponding to FIG. 6, and details are not repeated herein.

In some embodiments, the transaction refusing module 101 is configured to, when the second repeat transaction verification result indicates that the transaction attribute of the pending transaction is the repeat transaction attribute, determine that the pending transaction is a repeat transaction, and refuse to add the repeat transaction to the transaction pool of the first node.

In some embodiments, the second target determination module 102 is configured to, when the second repeat transaction verification result indicates that the transaction attribute of the pending transaction is the non-repeat transaction attribute, determine a second target transaction to be added to the transaction pool of the first node based on the pending transaction with the non-repeat transaction attribute, and save the second target transaction to the transaction pool of the first node.

The target mapping value determination module 103 is configured to, when the second target transaction is inserted into the repetition verification set of the repeat transaction verifier, take the transaction mapping values on the K target identification locations as second target transaction mapping values.

The element updating module 104 is configured to control the repeat transaction verifier to update array elements on target identification locations corresponding to the second target transaction mapping values in the bit array to be queried to second array elements, and take the updated bit array to be queried as a target bit array.

In some embodiments, when the transaction source attribute is a second source attribute, the repeat transaction verification policy includes a third repeat transaction verification policy and a fourth repeat transaction verification policy that are associated with the transaction cache of the first node; the second source attribute is used for characterizing the pending transaction as a transaction in a target block broadcasted by a second node in the blockchain network; each transaction in the target block corresponds to a transaction identifier, and the transaction identifier is used for characterizing a packaging order of the transaction in the target block.

The transaction identifier acquisition module 105 is configured to, based on the third repeat transaction verification policy, acquire a transaction identifier of a key transaction in the target block; the key transaction is a transaction with the maximum packaging order in N transactions included in the target block, and N is a positive integer.

The transaction identifier comparison module 106 is configured to compare a transaction identifier of the pending transaction with the transaction identifier of the key transaction to obtain an initial comparison result.

The different identifier determination module 107 is configured to, when the initial comparison result indicates that the transaction identifier of the pending transaction is different from the transaction identifier of the key transaction in the target block, determine that a next transaction of the pending transaction exists.

The block repetition verification result determination module 108 is configured to perform intra-block repeat transaction verification on the pending transaction in the target block by the repeat transaction verifier to obtain a block repeat transaction verification result associated with the pending transaction.

The transaction cache searching module 109 is configured to, when the block repeat transaction verification result indicates that the transaction attribute of the pending transaction in the target block is the repeat transaction attribute, search a transaction matching with the pending transaction from the transaction cache of the first node based on the fourth repeat transaction verification policy; and when the transaction matching with the pending transaction is found from the transaction cache, refuse to receive the target block broadcasted by the second node.

In some embodiments, the identical identifier determination module 110 is configured to, when the initial comparison result indicates that the transaction identifier of the pending transaction is identical to the transaction identifier of the key transaction in the target block and no next transaction of the pending transaction exists in the target block, determine that each transaction in the target block is a non-repeat transaction.

The hash value acquisition module 111 is configured to acquire a transaction hash value of each transaction in the target block by the repeat transaction verifier, and update the bit array in the repeat transaction verifier based on the transaction hash value of each transaction; and the transaction hash value of each transaction is determined by the K hash functions in the repeat transaction verifier.

For the specific implementations of the transaction acquisition module 100, the first repetition verification module 200, the mapping value determination module 300, and the first result determination module 400, reference may be made to description for step S101 to step S104 in the embodiment corresponding to FIG. 3, and details are not repeated herein. In some embodiments, for the specific implementations of the first relationship determination module 500, the first target determination module 600, the first target saving module 700, the second relationship determination module 800, the second repetition verification module 900, the transaction refusing module 101, the second target determination module 102, the target mapping value determination module 103 and the element updating module 104, reference may be made to description for step S201 to step S216 in the embodiment corresponding to FIG. 6, and details are not repeated herein. In some embodiments, for the specific implementations of the transaction identifier acquisition module 105, the transaction identifier comparison module 106, the different identifier determination module 107, the block repetition verification result determination module 108, the transaction cache searching module 109, the identical identifier determination module 110 and the hash value acquisition module 111, reference may be made to description for the third repeat transaction verification policy and the fourth repeat transaction verification policy in the embodiment corresponding to FIG. 9 or FIG. 10, and details are not repeated herein. In may be understood that beneficial effects achieved by using the same method are not described herein again.

Figure 12:
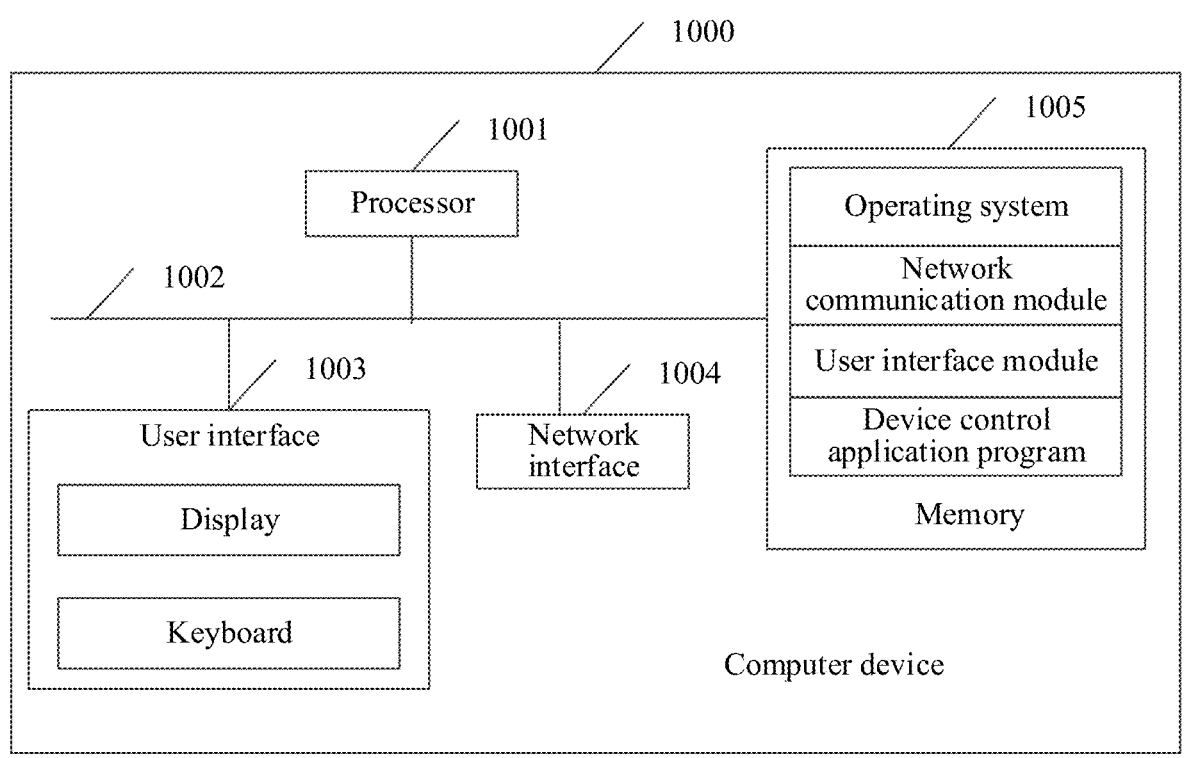
FIG. 12 is a schematic structural diagram of a computer device according to one embodiment.

Further, FIG. 12 is a schematic structural diagram of a computer device according to one embodiment. As shown in FIG. 12, the computer device 1000 may be applied to the blockchain node in the foregoing embodiment corresponding to FIG. 1 and the computer device 1000 may include a processor 1001, a network interface 1004, and a memory 1005, as well as a user interface 1003 and at least one communication bus 1002. The communication bus 1002 is configured to implement connection and communication between these components. The user interface 1003 may include a display and a keyboard. In some embodiments, the user interface 1003 may further include a standard wired interface and a wireless interface. In some embodiments, the network interface 1004 may include a standard wired interface and a standard wireless interface (such as a Wi-Fi interface). The memory 1005 may be a high-speed RAM, or may be a non-volatile memory, for example, at least one magnetic disk memory. In some embodiments, the memory 1005 may be at least one storage apparatus that is located far away from the processor 1001. As shown in FIG. 12, the memory 1005 used as a computer storage medium may include an operating system, a network communication module, a user interface module, and a device control application program.

The network interface 1004 in the computer device 1000 may also provide a network communication function, and the optional user interface 1003 may further include a display and a keyboard. In the computer device 1000 shown in FIG. 12, the network interface 1004 may provide the network communication function, and the user interface 1003 is mainly configured to provide an input interface for a user. The processor 1001 may be configured to call a device-control application stored in the memory 1005, so as to implement the descriptions of the repeat transaction verification method in the foregoing embodiment corresponding to FIG. 3, FIG. 6 or FIG. 9, or implement the descriptions of the repeat transaction verification apparatus 1 in the foregoing embodiment corresponding to FIG. 11, and details are not repeated herein. In addition, beneficial effects achieved by using the same method are not described herein again.

In addition, it should be noted that: one embodiment further provides a computer-readable storage medium, storing a computer program executed by the repeat transaction verification apparatus 1 mentioned above. The computer program includes program instructions, when executing the program instructions, the processor can perform the descriptions of the repeat transaction verification method in the foregoing embodiment corresponding to FIG. 3, FIG. 6 or FIG. 9. Therefore, details are not described herein again. In addition, beneficial effects achieved by using the same method are not described herein again. For technical details that are not disclosed in the embodiment of the computer storage medium of this application, reference may be made to the descriptions of the method embodiments of this application.

A person of ordinary skill in the art may understand that all or some of the procedures of the methods in the embodiments may be implemented by using a computer program instructing relevant hardware. The program may be stored in a computer-readable storage medium. When the program is executed, the procedures of the foregoing method embodiments may be included. The storage medium may be a magnetic disc, an optical disc, a read-only memory (ROM), a random access memory (RAM), or the like.

The foregoing disclosure is merely exemplary embodiments of this application, and certainly is not intended to limit the scope of the claims of this application. Therefore, equivalent variations made in accordance with the claims of this application shall fall within the scope of this application.

What is claimed is:

1. A repeat transaction verification method, performed by a first node in a blockchain network, a repeat transaction verifier being deployed in the first node, and the method comprising:

acquiring a pending transaction to be stored on a blockchain of the blockchain network;

acquiring a bit array and K hash functions of the repeat transaction verifier during first repeat transaction verification performed on the pending transaction by the repeat transaction verifier and identifying the acquired bit array as a bit array to be queried corresponding to the pending transaction, the bit array to be queried comprising M array elements, the M array elements comprising first array elements, M being an integer greater than 1 and K being a positive integer less than M;

based on the K hash functions, mapping the pending transaction to K target identification locations of the bit array, among the M array elements, identifying array elements on the K target identification locations as transaction mapping values on the K target identification locations;

obtaining a first repeat transaction verification result of the first repeat transaction verification performed on the pending transaction based on an association between the first array elements and the transaction mapping values on the K target identification locations;

in response to the first repeat transaction verification result indicating that the transaction mapping values identical to the first array elements exist in the transaction mapping values on the K target identification locations, determining that the pending transaction is not a repetition verification element in a repetition verification set of the repeat transaction verifier and controlling the repeat transaction verifier to output a transaction attribute of the pending transaction as a non-repeat transaction attribute; and in response to the first repeat transaction verification result indicating that the transaction mapping values identical to the first array elements do not exist in the transaction mapping values on the K target identification locations: acquiring a second repeat transaction verification policy associated with the transaction pool of the first node, and performing second repeat transaction verification on the pending transaction based on the second repeat transaction verification policy to obtain a second repeat transaction verification result.

2. The method according to claim 1, during the acquiring a pending transaction to be stored on a blockchain of the blockchain network, the method further comprising:

determining a transaction source attribute of the pending transaction, the transaction source attribute being used for indicating a repeat transaction verification policy used by the repeat transaction verifier during repeat transaction verification performed on the pending transaction.

3. The method according to claim 2, wherein when the transaction source attribute is a first source attribute, the repeat transaction verification policy comprises a first repeat transaction verification policy associated with a transaction pool of the first node, the first source attribute being used for characterizing the pending transaction as a transaction in a transaction adding request, the transaction adding request being transmitted by a blockchain client associated with the first node;

the acquiring a bit array and K hash functions of the repeat transaction verifier during first repeat transaction verification performed on the pending transaction by the repeat transaction verifier and identifying the acquired bit array as a bit array to be queried corresponding to the pending transaction comprises:

during the first repeat transaction verification performed on the pending transaction by the repeat transaction verifier based on the first repeat transaction verification policy, acquiring a bit array with an array length of M from the repeat transaction verifier, and acquiring K hash functions associated with the bit array with the array length of M, in the bit array with the array length of M, all array elements on K key identification locations, which are mapped by repetition verification elements in a repetition verification set of the repeat transaction verifier, being second array elements, one key identification location being an identification location obtained by performing hash location mapping on the repetition verification elements by one hash function;

in the bit array with the array length of M, identifying array elements except the second array elements in the M array elements as the first array elements; identification locations corresponding to the first array elements being different from identification locations corresponding to the second array elements, and the sum of the quantity of elements of the first array elements and the quantity of elements of the second array elements being M; and identifying a bit array composed of the first array elements and the second array elements as the bit array to be queried corresponding to the pending transaction.

4. The method according to claim 2, wherein when the transaction source attribute is a second source attribute, the repeat transaction verification policy comprises a third repeat transaction verification policy and a fourth repeat transaction verification policy that are associated with a transaction cache of the first node; the second source attribute being used for characterizing the pending transaction as a transaction in a target block broadcasted by a second node in the blockchain network; each transaction in the target block corresponding to a transaction identifier, and the transaction identifier being used for characterizing a packaging order of the transaction in the target block; and the method further comprises:

based on the third repeat transaction verification policy, acquiring a transaction identifier of a key transaction in the target block, the key transaction being a transaction with a maximum packaging order in N transactions comprised in the target block, and N being a positive integer;

comparing a transaction identifier of the pending transaction with the transaction identifier of the key transaction to obtain an initial comparison result;

when the initial comparison result indicates that the transaction identifier of the pending transaction is different from the transaction identifier of the key transaction in the target block, determining that a next transaction of the pending transaction exists;

performing intra-block repeat transaction verification on the pending transaction in the target block by the repeat transaction verifier to obtain a block repeat transaction verification result associated with the pending transaction; and when the block repeat transaction verification result indicates that a transaction attribute of the pending transaction in the target block is a repeat transaction attribute, searching a transaction corresponding to the pending transaction from the transaction cache of the first node based on the fourth repeat transaction verification policy, and when the transaction corresponding to the pending transaction is found from the transaction cache, refusing to receive the target block broadcasted by the second node.

5. The method according to claim 4, the method further comprising:

when the initial comparison result indicates that the transaction identifier of the pending transaction is identical to the transaction identifier of the key transaction in the target block and the pending transaction being last in the target block, determining that each transaction in the target block is a non-repeat transaction; and acquiring a transaction hash value of each transaction in the target block by the repeat transaction verifier, and updating the bit array in the repeat transaction verifier based on the transaction hash value of each transaction, the transaction hash value of each transaction being determined by the K hash functions in the repeat transaction verifier.

6. The method according to claim 1, wherein the method further comprises:
  determining the pending transaction with the non-repeat transaction attribute as a first target transaction to be saved to the transaction pool of the first node.

7. The method according to claim 6, the method further comprising:
  during saving the first target transaction to the transaction pool of the first node, identifying the transaction mapping values identical to the first array elements on the K target identification locations as first target transaction mapping values, and updating array elements on target identification locations corresponding to the first target transaction mapping values from the first array elements to second array elements in the bit array to be queried.

8. The method according to claim 1, wherein the performing second repeat transaction verification on the pending transaction based on the second repeat transaction verification policy to obtain a second repeat transaction verification result comprises:
  based on the second repeat transaction verification policy, searching a first historical transaction corresponding to the pending transaction from the transaction pool of the first node;
  when the first historical transaction corresponding to the pending transaction is found from the transaction pool of the first node, determining that a transaction attribute of the pending transaction is a repeat transaction attribute, identifying the pending transaction with the repeat transaction attribute as a first-class repeat transaction associated with the second repeat transaction verification policy; and
  identifying the first-class repeat transaction as the second repeat transaction verification result obtained by performing the second repeat transaction verification on the pending transaction.

9. The method according to claim 8, the method further comprising:
  when the first historical transaction corresponding to the pending transaction is not found from the transaction pool of the first node, determining that the transaction attribute of the pending transaction is a first non-repeat transaction attribute, identifying the pending transaction with the first non-repeat transaction attribute as a first transitional repetition verification result associated with the second repeat transaction verification policy;
  based on the first transitional repetition verification result, identifying the pending transaction with the first non-repeat transaction attribute as a first transitional transaction and searching a second historical transaction corresponding to the first transitional transaction from a transaction cache of the first node;
  when the second historical transaction corresponding to the first transitional transaction is found from the transaction cache of the first node, determining that a transaction attribute of the first transitional transaction is a repeat transaction attribute; identifying the first transitional transaction with the repeat transaction attribute as a second-class repeat transaction associated with the second repeat transaction verification policy; and
  identifying the second-class repeat transaction as the second repeat transaction verification result obtained by performing the second repeat transaction verification on the pending transaction.

10. The method according to claim 9, the method further comprising:
  when the second historical transaction corresponding to the first transitional transaction is not found from the transaction cache of the first node, determining that the transaction attribute of the first transitional transaction is a second non-repeat transaction attribute, identifying the first transitional transaction with the second non-repeat transaction attribute as a second transitional repetition verification result associated with the second repeat transaction verification policy;
  based on the second transitional repetition verification result, identifying the first transitional transaction with the second non-repeat transaction attribute as a second transitional transaction and searching a third historical transaction corresponding to the second transitional transaction from a blockchain database associated with first node;
  when the third historical transaction corresponding to the second transitional transaction is found from the blockchain database, determining that a transaction attribute of the second transitional transaction is a repeat transaction attribute, identifying the second transitional transaction with the repeat transaction attribute as a third-class repeat transaction associated with the second repeat transaction verification policy; and
  identifying the third-class repeat transaction as the second repeat transaction verification result obtained by performing the second repeat transaction verification on the pending transaction.

11. The method according to claim 1, the method further comprising: when the second repeat transaction verification result indicates that the transaction attribute of the pending transaction is the repeat transaction attribute, determining that the pending transaction is a repeat transaction, and refusing to add the repeat transaction to the transaction pool of the first node.

12. The method according to claim 1, the method further comprising: when the second repeat transaction verification result indicates that the transaction attribute of the pending transaction is the non-repeat transaction attribute, determining a second target transaction to be added to the transaction pool of the first node based on the pending transaction with the non-repeat transaction attribute, and saving the second target transaction to the transaction pool of the first node; when the second target transaction is inserted into a repetition verification set of the repeat transaction verifier, identifying the transaction mapping values on the K target identification locations as second target transaction mapping values; and updating, by the repeat transaction verifier, array elements on target identification locations corresponding to the second target transaction mapping values in the bit array to be queried to second array elements, and identifying the updated bit array to be queried as a target bit array.

13. A computer device of a first node in a blockchain network, comprising a processor and a memory;
  the processor being connected to the memory, the memory being configured to store a computer program, and the processor being configured to invoke the computer program to cause the computer device to perform:
  acquiring a pending transaction to be stored on a blockchain of the blockchain network, a repeat transaction verifier being deployed in the first node;
  acquiring a bit array and K hash functions of the repeat transaction verifier during first repeat transaction verification performed on the pending transaction by the repeat transaction verifier and identifying the acquired bit array as a bit array to be queried corresponding to the pending transaction, the bit array to be queried comprising M array elements, the M array elements comprising first array elements, M being an integer greater than 1 and K being a positive integer less than M;

based on the K hash functions, mapping the pending transaction to K target identification locations of the bit array, among the M array elements, identifying array elements on the K target identification locations as transaction mapping values on the K target identification locations;

obtaining a first repeat transaction verification result of the first repeat transaction verification performed on the pending transaction based on an association between the first array elements and the transaction mapping values on the K target identification locations;

in response to the first repeat transaction verification result indicating that the transaction mapping values identical to the first array elements exist in the transaction mapping values on the K target identification locations, determining that the pending transaction is not a repetition verification element in a repetition verification set of the repeat transaction verifier and controlling the repeat transaction verifier to output a transaction attribute of the pending transaction as a non-repeat transaction attribute; and in response to the first repeat transaction verification result indicating that the transaction mapping values identical to the first array elements do not exist in the transaction mapping values on the K target identification locations: acquiring a second repeat transaction verification policy associated with the transaction pool of the first node, and performing second repeat transaction verification on the pending transaction based on the second repeat transaction verification policy to obtain a second repeat transaction verification result.

14. The computer device according to claim 13, wherein during the acquiring a pending transaction to be stored on a blockchain of the blockchain network, the processor is further configured to perform:

determining a transaction source attribute of the pending transaction, the transaction source attribute being used for indicating a repeat transaction verification policy used by the repeat transaction verifier during repeat transaction verification performed on the pending transaction.

15. The computer device according to claim 14, wherein when the transaction source attribute is a first source attribute, the repeat transaction verification policy comprises a first repeat transaction verification policy associated with a transaction pool of the first node, the first source attribute being used for characterizing the pending transaction as a transaction in a transaction adding request, the transaction adding request being transmitted by a blockchain client associated with the first node;

the acquiring a bit array and K hash functions of the repeat transaction verifier during first repeat transaction verification performed on the pending transaction by the repeat transaction verifier and identifying the acquired bit array as a bit array to be queried corresponding to the pending transaction comprises:

during the first repeat transaction verification performed on the pending transaction by the repeat transaction verifier based on the first repeat transaction verification policy, acquiring a bit array with an array length of M from the repeat transaction verifier, and acquiring K hash functions associated with the bit array with the array length of M, in the bit array with the array length of M, all array elements on K key identification locations, which are mapped by repetition verification elements in a repetition verification set of the repeat transaction verifier, being second array elements, one key identification location being an identification location obtained by performing hash location mapping on the repetition verification elements by one hash function;

in the bit array with the array length of M, identifying array elements except the second array elements in the M array elements as the first array elements; identification locations corresponding to the first array elements being different from identification locations corresponding to the second array elements, and the sum of the quantity of elements of the first array elements and the quantity of elements of the second array elements being M; and identifying a bit array composed of the first array elements and the second array elements as the bit array to be queried corresponding to the pending transaction.

16. The computer device according to claim 13, wherein the processor is further configured to perform:

determining the pending transaction with the non-repeat transaction attribute as a first target transaction to be saved to the transaction pool of the first node.

17. The computer device according to claim 16, wherein the processor is further configured to perform:

during saving the first target transaction to the transaction pool of the first node, identifying the transaction mapping values identical to the first array elements on the K target identification locations as first target transaction mapping values, and updating array elements on target identification locations corresponding to the first target transaction mapping values from the first array elements to second array elements in the bit array to be queried.

18. A non-transitory computer-readable storage medium, storing a computer program, the computer program, suitable for being loaded or executed by a processor to cause a computer device of a first node in a blockchain network with the processor to perform:

acquiring a pending transaction to be stored on a blockchain of the blockchain network;

acquiring a bit array and K hash functions of the repeat transaction verifier during first repeat transaction verification performed on the pending transaction by the repeat transaction verifier and identifying the acquired bit array as a bit array to be queried corresponding to the pending transaction, the bit array to be queried comprising M array elements, the M array elements comprising first array elements, M being an integer greater than 1 and K being a positive integer less than M;

based on the K hash functions, mapping the pending transaction to K target identification locations of the bit array, among the M array elements, identifying array elements on the K target identification locations as transaction mapping values on the K target identification locations;

obtaining a first repeat transaction verification result of the first repeat transaction verification performed on the pending transaction based on an association between the first array elements and the transaction mapping values on the K target identification locations;

in response to the first repeat transaction verification result indicating that the transaction mapping values identical to the first array elements exist in the transaction mapping values on the K target identification locations, determining that the pending transaction is not a repetition verification element in a repetition verification set of the repeat transaction verifier and controlling the repeat transaction verifier to output a transaction attribute of the pending transaction as a non-repeat transaction attribute; and in response to the first repeat transaction verification result indicating that the transaction mapping values identical to the first array elements do not exist in the transaction mapping values on the K target identification locations: acquiring a second repeat transaction verification policy associated with the transaction pool of the first node, and performing second repeat transaction verification on the pending transaction based on the second repeat transaction verification policy to obtain a second repeat transaction verification result.

* * * * *